United States Patent
Seregin et al.

(10) Patent No.: US 11,166,033 B2
(45) Date of Patent: Nov. 2, 2021

(54) ADAPTATION PARAMETER SET IN ACCESS UNIT IN VIDEO CODING

(71) Applicant: QUALCOMM Incorporated, San Diego, CA (US)

(72) Inventors: Vadim Seregin, San Diego, CA (US); Muhammed Zeyd Coban, Carlsbad, CA (US); Adarsh Krishnan Ramasubramonian, Irvine, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/893,100

(22) Filed: Jun. 4, 2020

(65) Prior Publication Data

US 2020/0389655 A1    Dec. 10, 2020

Related U.S. Application Data

(60) Provisional application No. 62/858,250, filed on Jun. 6, 2019, provisional application No. 62/865,044, filed on Jun. 21, 2019.

(51) Int. Cl.
*H04N 19/169* (2014.01)
*H04N 19/174* (2014.01)
(Continued)

(52) U.S. Cl.
CPC ......... *H04N 19/188* (2014.11); *H04L 65/607* (2013.01); *H04N 19/174* (2014.11); *H04N 19/70* (2014.11)

(58) Field of Classification Search
CPC .... H04N 19/70; H04N 19/174; H04N 19/186; H04N 19/188; H04N 19/187; H04L 65/607

See application file for complete search history.

(56) References Cited

U.S. PATENT DOCUMENTS

2013/0022104 A1    1/2013   Chen et al.

FOREIGN PATENT DOCUMENTS

WO    WO-2020176633 A1 *   9/2020   ............. H04N 19/70

OTHER PUBLICATIONS

Bross B., et al., "Versatile Video Coding (Draft 5)", 126. MPEG Meeting, Mar. 25, 2019-Mar. 29, 2019, Geneva, (Motion Picture Expert Group of ISO/IEC JTC1/SC29/WG11), No. m48053, May 29, 2019 (May 29, 2019), XP030212625, 386 Pages, Retrieved from the Internet: URL:http://phenix.int-evry.fr/mpeg/doc_end_user/documents/126_Geneva/wg11/m48053-JVET-N1001-v7-JVET-N1001-v7.zip JVET-N1991-v7.docx [retrieved on May 29, 2019] p. 89-p. 95.

(Continued)

*Primary Examiner* — Obafemi O Sosanya
(74) *Attorney, Agent, or Firm* — Shumaker & Sieffert, P.A.

(57) ABSTRACT

A device is configured to obtain a bitstream that comprises an encoded representation of the video data. Additionally, the device is configured to determine that the bitstream does not satisfy a constraint imposed by a video coding standard based on a layer identifier of an applicable Luma Mapping and Chroma Scaling (LMCS) Adaptation Parameter Set (APS) Network Abstraction Layer (NAL) unit not being equal to a layer identifier of the coded slice NAL unit and not being equal to a layer identifier of any layer that is allowed to be used to predict a layer of the coded slice NAL unit. The applicable LMCS APS NAL unit has an APS identifier specified by a LMCS APS identifier syntax element for the coded slice NAL unit.

23 Claims, 8 Drawing Sheets

(51) Int. Cl.
*H04L 29/06* (2006.01)
*H04N 19/70* (2014.01)

(56) References Cited

OTHER PUBLICATIONS

International Search Report and Written Opinion—PCT/US2020/036264—ISA/EPO—dated Oct. 2, 2020 18 Pages.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v5, 14th Meeting: Geneva, CH, Mar. 19, 2019-Mar. 27, 2019, No. JVET-N1001, May 14, 2019 (May 14, 2019), XP030205193, 370 pages, Retrieved from the Internet: URL:http://phenix.int-evry.fr/jvet/doc_end_user/documents/14_Geneva/wg11/JVET-N1001-v5.zip JVET-N1001-v5.docx, [retrieved on May 14, 2019] pp. 94-98, paragraph 7.4.6.3., cited in the application Section 8.5.6.4;p. 212-p. 214.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.

ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.

Seregin, V. et al., "AHG17: APS for Low Latency ALF", JVET-P0588, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-2.

Seregin, V. et al., "AHG17: On TemporalId and NuhLayerId in APS", JVET-O0245-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-3.

* cited by examiner

ADAPTATION PARAMETER SET IN ACCESS UNIT IN VIDEO CODING

This application claims the benefit of U.S. Provisional Patent Application 62/858,250, filed Jun. 6, 2019, and U.S. Provisional Patent Application 62/865,044, filed Jun. 21, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for handling adaptation parameter sets (APSs) in video coding. As described in this disclosure, a set of constraints may be imposed that ensure that an APS applicable to a coded slice Network Abstraction Layer (NAL) unit is available for use when decoding the coded slice NAL unit. For instance, a constraint may require a layer identifier of a Luma Mapping and Chroma Scaling (LMCS) APS NAL unit to be equal to a layer identifier of the coded slice NAL unit or equal to a layer identifier of any layer that is allowed to be used to predict a layer of the coded slice NAL unit. This constraint may prevent a situation from arising in which the LMCS APS NAL unit specifies a layer identifier greater than a layer identifier of the VCL NAL unit of the second AU. Decoding errors may occur if this situation were to arise and the layer identified by the layer identifier of the LMCS APS NAL unit were removed in a sub-bitstream extraction process.

In one example, this disclosure describes a method of processing video data, the method comprising: obtaining a bitstream that comprises an encoded representation of the video data, wherein the bitstream includes a coded slice NAL unit for a slice of a picture of a current layer of the video data; and determining that the bitstream does not satisfy a constraint imposed by a video coding standard based on a layer identifier of an applicable LMCS APS NAL unit not being equal to a layer identifier of the coded slice NAL unit and not being equal to a layer identifier of any layer that is allowed to be used to predict a layer of the coded slice NAL unit, wherein the applicable LMCS APS NAL unit has an APS identifier specified by a LMCS APS identifier syntax element for the coded slice NAL unit.

In another example, this disclosure describes a method of encoding video data, the method comprising: obtaining video data from a video source; and performing an encoding process that encodes the video data according to a video coding standard, wherein performing the encoding process comprises: generating a LMCS APS identifier syntax element for a coded slice NAL unit, wherein: the LMCS APS identifier syntax element specifies a layer identifier of a LMCS APS NAL unit, and the video coding standard imposes a constraint on the encoding process that requires the layer identifier of the LMCS APS NAL unit to be equal to a layer identifier of the coded slice NAL unit or equal to a layer identifier of any layer that is allowed to be used to predict a layer of the coded slice NAL unit.

In another example, this disclosure describes a device for processing video data, the device comprising: a memory to store the video data, and one or more processors implemented in circuitry, the one or more processors configured to: obtain a bitstream that comprises an encoded representation of the video data, wherein the bitstream includes a coded slice NAL unit for a slice of a picture of a current layer of the video data; and determine that the bitstream does not satisfy a constraint imposed by a video coding standard based on a layer identifier of an applicable LMCS APS NAL unit not being equal to a layer identifier of the coded slice NAL unit and not being equal to a layer identifier of any layer that is allowed to be used to predict a layer of the coded slice NAL unit, wherein the applicable LMCS APS NAL unit has an APS identifier specified by a LMCS APS identifier syntax element for the coded slice NAL unit.

In another example, this disclosure describes a device for encoding video data, the device comprising: a memory to store the video data; and one or more processors implemented in circuitry, the one or more processors configured to: obtain video data from a video source; and perform an encoding process that encodes the video data according to a video coding standard, wherein the one or more processors are configured such that, as part of performing the encoding process, the one or more processors: generate a LMCS APS identifier syntax element for a coded slice NAL unit, wherein: the LMCS APS identifier syntax element specifies a layer identifier of a LMCS APS NAL unit, and the video coding standard imposes a constraint on the encoding process that requires the layer identifier of the LMCS APS NAL unit to be equal to a layer identifier of the coded slice NAL unit or equal to a layer identifier of any layer that is allowed to be used to predict a layer of the coded slice NAL unit.

In another example, this disclosure describes a device for processing video data, the device comprising: means for obtaining a bitstream that comprises an encoded representation of the video data, wherein the bitstream includes a coded slice NAL unit for a slice of a picture of a current layer of the video data; and means for determining that the bitstream does not satisfy a constraint imposed by a video coding standard based on a layer identifier of an applicable LMCS APS NAL unit not being equal to a layer identifier of the coded slice NAL unit and not being equal to a layer identifier of any layer that is allowed to be used to predict a layer of the coded slice NAL unit, wherein the applicable LMCS APS NAL unit has an APS identifier specified by a LMCS APS identifier syntax element for the coded slice NAL unit.

In another example, this disclosure describes a device for encoding video data, the device comprising: means for obtaining video data from a video source; and means for performing an encoding process that encodes the video data according to a video coding standard, wherein the means for performing the encoding process comprises: generating a LMCS APS identifier syntax element for a coded slice NAL unit, wherein: the LMCS APS identifier syntax element specifies a layer identifier of a LMCS APS NAL unit, and the video coding standard imposes a constraint on the encoding process that requires the layer identifier of the LMCS APS NAL unit to be equal to a layer identifier of the coded slice NAL unit or equal to a layer identifier of any layer that is allowed to be used to predict a layer of the coded slice NAL unit.

In another example, this disclosure describes a computer-readable data storage medium having stored thereon instructions that, when executed, cause one or more processors to: obtain a bitstream that comprises an encoded representation of the video data, wherein the bitstream includes a coded slice NAL unit for a slice of a picture of a current layer of the video data; and determine that the bitstream does not satisfy a constraint imposed by a video coding standard based on a layer identifier of an applicable LMCS APS NAL unit not being equal to a layer identifier of the coded slice NAL unit and not being equal to a layer identifier of any layer that is allowed to be used to predict a layer of the coded slice NAL unit, wherein the applicable LMCS APS NAL unit has an APS identifier specified by a LMCS APS identifier syntax element for the coded slice NAL unit.

In another example, this disclosure describes a computer-readable data storage medium having stored thereon instructions that, when executed, cause one or more processors to: obtain video data from a video source; and perform an encoding process that encodes the video data according to a video coding standard, wherein the instructions that cause the one or more processors to perform the encoding process comprise instructions that, when executed, cause the one or more processors to: generate a LMCS APS identifier syntax element for a coded slice NAL unit, wherein: the LMCS APS identifier syntax element specifies a layer identifier of a LMCS APS NAL unit, and the video coding standard imposes a constraint on the encoding process that requires the layer identifier of the LMCS APS NAL unit to be equal to a layer identifier of the coded slice NAL unit or equal to a layer identifier of any layer that is allowed to be used to predict a layer of the coded slice NAL unit.

The details of one or more examples are set forth in the accompanying drawings and the description below. Other features, objects, and advantages will be apparent from the description, drawings, and claims.

DETAILED DESCRIPTION

Figure 1:
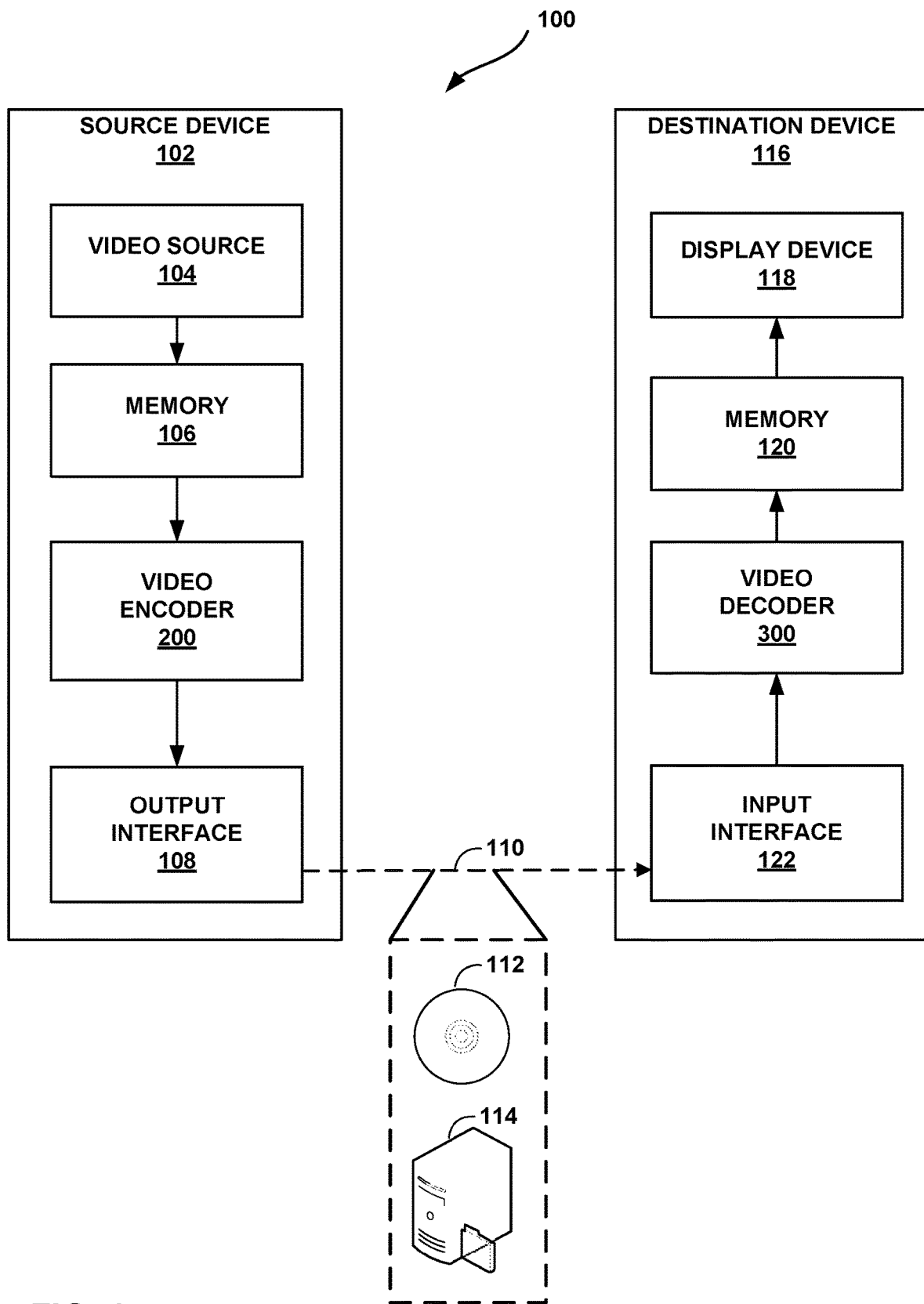
FIG. 1 is a block diagram illustrating an example video encoding and decoding system that may perform the techniques of this disclosure.

A video encoder encodes video data to generate a bitstream that includes an encoded representation of the video data. The encoded representation of the video data includes a set of Network Abstraction Layer (NAL) units. Each NAL unit may include a syntax element specifying a layer identifier and a syntax element specifying a temporal identifier. NAL units having the same valued layer identifier are considered to be in the same layer. Similarly, NAL units having the same valued temporal identifier are considered to be in the same temporal sublayer. In general, a video decoder can decode video data from a NAL unit without reference to any NAL unit with a higher layer identifier than the NAL unit or higher temporal sublayer identifier than the NAL unit.

An Adaptation Parameter Set (APS) is a parameter set that is used to carry frequently changed information, such as Adaptive Loop Filter (ALF) filter coefficients. APS NAL units contain APS's. In some video coding standards, such as the Versatile Video Coding (VVC) standard presently under development, there are several types of APS. For instance, the types of APS may include a Luma Mapping and Chroma Scaling (LMCS) APS. LMCS is a process that is applied as part of the decoding process that maps luma samples to particular values and may apply a scaling operation to the values of chroma samples. A LMCS APS includes syntax elements specifying parameters for mapping and scaling operations.

An access unit (AU) is a set of pictures that correspond to the same time instance. Each NAL unit associated with an AU has the same temporal identifier. In VVC, an APS NAL unit is used as an AU delimiter. An AU delimiter marks the start of a new AU. In other words, an APS NAL unit and NAL units arriving, in coding order, after the APS NAL unit belong to a different AU than NAL units arriving, in coding order, before the APS NAL unit.

However, there are circumstances, such as when an APS NAL unit is an ALF APS NAL unit or an LMCS APS NAL unit, in which it may be desirable include an APS NAL unit after the last Video Coding Layer (VCL) NAL unit of an AU and to have that APS NAL unit be considered part of the AU. The term "VCL NAL unit" is a collective term that applies to coded slice NAL units and potentially other types of NAL units that a video coding standard classifies as such. An APS NAL unit is considered to be applicable to (or activated for) a VCL NAL unit if the VCL NAL unit specifies an APS identifier of the APS NAL unit. It may be desirable to include an APS NAL unit after the last VCL NAL unit of an AU so that the APS NAL unit is able to include information derived from the VCL NAL units of the AU. This APS NAL unit may then be used for decoding VCL NAL units in subsequent AUs.

However, if an APS NAL unit in a first AU occurs after the last VCL NAL unit of the first AU and the APS NAL unit is applicable to a VCL NAL unit of a second, subsequent AU, a situation may arise in which the APS NAL unit specifies a layer identifier greater than a layer identifier of the VCL NAL unit of the second AU. Similarly, if an APS NAL unit in a first AU occurs after the last VCL NAL unit of the first AU and the APS NAL unit is applicable to a VCL NAL unit of a second, subsequent AU, the situation may arise in which the APS NAL unit specifies a temporal identifier greater than a temporal identifier of the VCL NAL unit of the second AU. In such situations, the APS NAL unit may not be available for use in decoding the VCL NAL unit of the second AU. This may lead to decoding errors or may prevent the selective removal of layers or temporal sub-layers for purposes of scaling the amount of encoded data transmitted or decoded.

This disclosure describes techniques that may address the issues described above. For instance, in one example, a video device, such as a video decoder or other type of device, may obtain a bitstream that includes an encoded representation of the video data. Additionally, the video device may determine that the bitstream does not satisfy a constraint imposed by a video coding standard based on a layer identifier of an applicable LMCS APS NAL unit not being equal to a layer identifier of the coded slice NAL unit and not being equal to a layer identifier of any layer that is allowed to be used to predict a layer of the coded slice NAL unit. In this example, the applicable LMCS APS NAL unit has an APS identifier specified by a LMCS APS identifier syntax element for the coded slice NAL unit.

In another example, a video encoder may obtain video data from a video source. Additionally, the video encoder may perform an encoding process that encodes the video data according to a video coding standard. Performing the encoding process may include generating an LMCS APS identifier syntax element for a coded slice NAL unit. In this example, the LMCS APS identifier syntax element specifies a layer identifier of a LMCS APS NAL unit. In this example, the video coding standard imposes a constraint on the encoding process that requires the layer identifier of the LMCS APS NAL unit to be equal to a layer identifier of the coded slice NAL unit or equal to a layer identifier of any layer that is allowed to be used to predict a layer of the coded slice NAL unit.

Imposition of the constraint in these examples may prevent the coded slice NAL unit from referring to an LMCS APS NAL unit that is potentially unavailable. This may prevent decoding errors and/or may better enable the selective transmitting and decoding of particular layers or temporal sub-layers.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, notebook (i.e., laptop) computers, mobile devices, tablet computers, set-top boxes, telephone handsets such smart-phones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for handling adaptation parameter sets in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for handling adaptation parameter sets in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva CH, 19-27 Mar. 2019, JVET-N1001-v5 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tre unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tre units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

LMCS is a coding tool in which input samples are converted to output samples using a transformation function. The transformation function can be represented by a look-up table. As a result, one sample value maps to another sample value, and the output sample values may be compressed more efficiently.

A bitstream may include a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

A slice of a picture may include an integer number of blocks of the picture. For example, a slice of a picture may include an integer number of CTUs of the picture. The CTUs of a slice may be ordered consecutively in a scan order, such as a raster scan order. In some video coding specifications, a slice is defined as an integer number of CTUs contained in one independent slice segment and all subsequent dependent slice segments (if any) that precede the next independent slice segment (if any) within the same access unit. Furthermore, in some video coding specifications, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture. An intra slice is a slice that includes intra coded blocks and does not include inter coded blocks. An inter slice may include inter and intra coded blocks.

As noted above, a bitstream may include a representation of encoded pictures of the video data and associated data. The associated data may include parameter sets. NAL units may encapsulate RBSPs for video parameter sets (VPSs), sequence parameter sets (SPSs), and picture parameter sets (PPSs). A VPS is a syntax structure including syntax elements that apply to zero or more entire coded video sequences (CVSs). An SPS is also a syntax structure including syntax elements that apply to zero or more entire CVSs.

An SPS may include a syntax element that identifies a VPS that is active when the SPS is active. Thus, the syntax elements of a VPS may be more generally applicable than the syntax elements of an SPS. A PPS is a syntax structure including syntax elements that apply to zero or more coded pictures. A PPS may include a syntax element that identifies an SPS that is active when the PPS is active. A slice header of a slice may include a syntax element that indicates a PPS that is active when the slice is being coded.

As discussed above, video encoder 200 may generate a bitstream that includes a series of NAL units. In multi-layer video coding, different NAL units of the bitstream may be associated with different layers of the bitstream. A layer may be defined as a set of video coding layer (VCL) NAL units and associated non-VCL NAL units that have the same layer identifier. For instance, NAL units may include headers (i.e., NAL unit headers) and payloads (e.g., RBSPs). The NAL unit headers may include layer identifier syntax elements. NAL units that have layer identifier syntax elements that specify different values belong to different "layers" of a bitstream. Thus, in multi-layer coding, the layer identifier syntax element of the NAL unit specifies a layer identifier (i.e., a layer ID) of the NAL unit.

A layer may be equivalent to a view in multi-view video coding. In multi-view video coding, a layer can contain all view components of the same layer, with different time instances. In multi-layer video coding, the term "access unit" may refer to a set of pictures that correspond to the same time instance. For instance, all pictures in an access unit may have the same output time. Thus, a "view component" may be a coded representation of a view in a single access unit.

In some examples, a view component may include a texture view component (i.e., a texture picture) or a depth view component (i.e., a depth picture). In some examples of multi-view video coding, a layer contains either coded depth pictures of a specific view or coded texture pictures of a specific view, but not both depth pictures and texture pictures. In other examples of multi-view video coding, a layer contains both texture view components and depth view components of a specific view.

In the context of scalable video coding, a layer typically corresponds to coded pictures having video characteristics different from coded pictures in other layers. Such video characteristics typically include spatial resolution and quality level (e.g., Signal-to-Noise Ratio).

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream (e.g., a layer associated with a highest layer identifier) may be removed from the bitstream without affecting the decodability of data in the remaining layers of the bitstream. In multi-view coding, higher layers may include additional view components. In scalable video coding, higher layers may include signal to noise ratio (SNR) enhancement data, spatial enhancement data, and/or temporal enhancement data. In multi-layer video coding, a layer may be referred to as a "base layer" if a video decoder can decode pictures in the layer without reference to data of any other layer. In HEVC and other video coding specifications, a layer identifier of a NAL unit is equal to 0 if the NAL unit is in a base layer. If the NAL unit does not relate to a base layer in multi-layer coding, the layer identifier of the NAL unit may have a non-zero value.

In scalable video coding, layers other than the base layer may be referred to as "enhancement layers" and may provide information that enhances the visual quality of video data decoded from the bitstream. Scalable video coding can enhance spatial resolution, signal-to-noise ratio (i.e., quality) or temporal rate.

Multi-layer video coding may support inter-layer prediction. Inter-layer prediction is similar to the inter prediction used in HEVC and other video coding specifications and may use the same syntax elements. However, when a video coder performs inter-layer prediction on a current block, the video coder may use, as a reference picture, a picture that is in the same access unit as the current block, but in a different layer. In contrast, conventional inter prediction only uses pictures in different access units as reference pictures. When coding a current picture in one of the non-base layers, a video coder may add a picture into a reference picture list if the picture is in a different layer but within a same time instance (i.e., same access unit) as the current picture.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer," "temporal layer," or a "temporal sub-layer." Thus, temporal scalability may be achieved within one layer by defining a group of pictures with a particular temporal level as a sub-layer (i.e., temporal layer).

NAL units may include temporal identifier (e.g., temporal_id in HEVC) syntax elements. The temporal identifier syntax element of a NAL unit specifies a temporal identifier of the NAL unit. The temporal identifier of a NAL unit identifies a temporal sub-layer with which the NAL unit is associated. Thus, each temporal sub-layer of a layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

In VVC, an adaptation parameter set (APS) is used to carry frequently changed information, such as ALF filter coefficients. Furthermore, in VVC, a bitstream is organized in network abstraction layer (NAL) units. The NAL units are grouped in access units (AUs) including respective sets NAL units that are associated with each other according to a specified classification rule, are consecutive in decoding order, and contain exactly one coded picture for each layer present in the access unit. NAL units may be of different types such as parameter set units (e.g., VPS. SPS, PPS, and APS), or video coding layer (VCL) NAL units. VCL NAL units carry encoded slices.

The following text is an excerpt from VVC Draft 5 related to access units and constraints on NAL unit types:
The first of any of the following NAL units preceding firstVclNalUnitInAu and succeeding the last VCL NAL unit preceding firstVclNalUnitInAu, if any, specifies the start of a new access unit:
access unit delimiter NAL unit (when present),
DPS NAL unit (when present),
VPS NAL unit (when present),
SPS NAL unit (when present),
PPS NAL unit (when present),
APS NAL unit (when present),
Prefix SEI NAL unit (when present),
NAL units with NalUnitType equal to RSV_NVCL_5, RSV_NVCL_6, RSV_NVCL_21, or RSV_NVCL_22 (when present),
NAL units with NalUnitType in the range of UNSPEC28 . . . UNSPEC29 (when present).

The value of TemporalId for non-VCL NAL units is constrained as follows:
If NalUnitType is equal to SPS_NUT, TemporalId is equal to 0 and the TemporalId of the layer access unit containing the NAL unit shall be equal to 0.
Otherwise, if NalUnitType is equal to APS_NUT, TemporalId shall be equal to that of the layer access unit containing the NAL unit.
Otherwise, when NalUnitType is not equal to EOS_NUT and not equal to EOB_NUT, TemporalId shall be greater than or equal to the TemporalId of the layer access unit containing the NAL unit.

As defined in VVC Draft 5, a layer access unit is a set of NAL units for which the VCL NAL units all have a particular value of NuhLayerId, that are associated with each other according to a specified classification rule, that are consecutive in decoding order, and that contain exactly one coded picture.

Another restriction in VVC Draft 5 on the location of the APS NAL units is reproduced below. As shown below, enclosed in <!> . . . </!> tags, an APS associated with a particular picture is prohibited from following the last VCL NAL unit of the picture in decoding order.

The order of the coded pictures and non-VCL NAL units within a layer access unit or an access unit shall obey the following constraints:
When an access unit delimiter NAL unit is present in a layer access unit, it shall be the first NAL unit in the layer access unit. There shall be at most one access unit delimiter NAL unit in any layer access unit.
<!>When any DPS NAL units, VPS NAL units, SPS NAL units, PPS NAL units, APS NAL units, prefix SEI NAL units, NAL units with NalUnitType equal to RSV_NVCL_5, RSV_NVCL_6, RSV_NVCL_21, or RSV_NVCL_22, or NAL units with NalUnitType in the range of UNSPEC28 . . . UNSPEC29 are present in a layer access unit, they shall not follow the last VCL NAL unit of the layer access unit.</!>
NAL units having NalUnitType equal to SUFFIX_SEI_NUT, RSV_NVCL_7, or RSV_NVCL_23, or in the range of UNSPEC30 . . . UNSPEC31 in a layer access unit shall not precede the first VCL NAL unit of the layer access unit.
When an end of sequence NAL unit is present in an access unit, it shall be the last NAL unit among all NAL units with in the access unit other than an end of bitstream NAL unit (when present).
When an end of bitstream NAL unit is present in an access unit, it shall be the last NAL unit in the access unit.

In VVC Draft 5, an APS NAL unit may be used as an AU delimiter in certain cases, meaning that an APS may indicate the start of a new AU including the APS. When an APS is signaled after the last VCL NAL unit of a picture, the APS is considered to begin a new access unit. However, in several cases, it is desirable to signal the APS after the VCL NAL unit with the information derived based on that VCL NAL unit, for example ALF coefficients. In such cases, the APS should not belong to the next AU.

Secondly, an APS temporal ID is assigned to be equal to the temporal ID of the AU; so if an APS belongs to the next AU, then the temporal ID shall be equal to the temporal ID of the next AU and not the current AU. If the next AU temporal ID has a larger ID value than the current AU temporal ID, then this APS cannot be used for temporal ID equal to the current AU temporal ID even if the APS was derived from that temporal ID. Otherwise, temporal scalability may be broken.

Finally, VVC Draft 5 does not allow VCL NAL unit, APS NAL unit, and APS NAL unit mixing in the current AU, where each VCL NAL unit may be a slice of the same picture and the APSs signal information derived from each slice, such as ALF coefficients. However, it some situations, it may be desirable to have VCL, APS, VCL, and APS NAL unit mixing in an AU. In one example, during encoding, the APS parameters may be derived from each slice. If the mix of VCL and APS is allowed, then after the parameters are derived, the APS can be sent out to a bitstream. However if such mix is disallowed, then video encoder 200 may need to buffer all the APSs and send them after all VCLs. Buffering the APSs may require additional storage. Buffering the APSs may also introduce the problem that if the same APS is used in different VCL NAL units, APS parameters will be overwritten in the storage memory, which may introduce a mismatch when decoding the bitstream.

The following numbered aspects of this disclosure may address the aforementioned problems. These aspects may be applied individually or in any combination.

In a first aspect, video coders do not use an APS as an AU delimiter. Constraints specifying that an APS may begin a new AU may be removed in such cases. Constraints that disallow an APS to follow the last VCL NCL unit of the associated picture may also be removed.

In a second aspect, assignment of an APS temporal ID is decoupled from the temporal ID of the AU with which the APS is associated. For example, the APS temporal ID may be assigned from the AU from which the APS temporal ID was derived. Thus, in the second aspect, video encoder 200 may include, in a bitstream that includes an encoded representation of the video data, an APS NAL unit. Additionally, in this example, video encoder 200 may include, in the bitstream, a VCL NAL unit that follows the APS NAL unit in the bitstream. In this example, the VCL NAL unit belongs to the same access unit as the APS NAL unit. Similarly, video decoder 300 may obtain, from a bitstream that includes an encoded representation of video data, an APS NAL unit and obtain, from the bitstream, a VCL NAL unit that follows the APS NAL unit in the bitstream. In this example, video decoder 300 may determine that the VCL NAL unit belongs to the same access unit as the APS NAL unit. Additionally, video decoder 300 may decode a slice of a picture of the video data based on the VCL NAL unit and the APS NAL unit.

In a third aspect, interleaving of the VCL with the same POC value (i.e., belonging to the same picture) and APS NAL units within the AU is allowed. In other words, video encoder 200 may include, in a bitstream that includes an encoded representation of the video data, a series of NAL units that includes VCL NAL units with a same picture order count (POC) value interleaved with APS NAL units within an access unit. Similarly, video decoder 300 may obtain, from a bitstream that includes an encoded representation of the video data, a series of NAL units that includes VCL NAL units with a same POC value interleaved with APS NAL units within an access unit. In this example, video decoder 300 may decode pictures of the access unit based on the VCL NAL units and the APS NAL units.

In a fourth aspect, if NalUnitType is equal to APS_NUT, TemporalId shall be less than or equal to that of the layer access unit containing the NAL unit.

In a fifth aspect, the current temporal Id assignment for APS is kept, i.e., temporalId shall be equal to that of the layer access unit containing the NAL unit, but added is an encoder or bitstream constraint that the APS associated with the access unit cannot have the APS IDs equal to any APS IDs which are used in the access unit. For example, if the AU uses APS IDs equal to 2, 4, and 1 for the ALF filtering, then the derived (associated) APS in that access unit cannot have the APS ID equal to 1, 2 and 4; instead, the derived APS should use some other APS ID values, for example, ID equal to 0. The derived APS may include information (e.g., ALF filter coefficients) derived based on information in VCL NAL units of the access unit. In such case, the APS can be signaled before the VCL NAL unit in the AU and will not overwrite the existing APS, which may be used in the AU filtering. For the example above, if the associated APS has an ID equal to 1 and is signaled before the VCL NAL unit, then the associated APS replaces the old APS with ID equal to 1, which is used for filtering for the picture in the AU; then the decoded picture will have a mismatch since the filter coefficients may be different in the new APS.

Thus, with respect to the example above, video encoder 200 may include, in a bitstream that includes an encoded representation of video data, an APS associated with an access unit (e.g., a derived APS that is in the access unit). In this example, a constraint prohibits the APS associated with the access unit from having an APS identifier equal to any APS identifier used in the access unit. In this example, video encoder 200 may encode pictures of a subsequent access unit based on the APS associated with the access unit. In this example, video decoder 300 may obtain, from a bitstream that includes an encoded representation of the video data, an APS associated with an access unit, wherein a constraint prohibits the APS associated with the access unit from having an APS identifier equal to any APS identifier used in the access unit. In this example, video decoder 300 may decode pictures of a subsequent access unit based on the APS associated with the access unit. Encoding and decoding a picture based on an APS may include determining ALF parameters based on the APS and using the determined ALF parameters to apply an ALF to a block of a slice of the picture. In these examples, the constraint enables the bitstream to still include a derived APS at the end of an access unit while preventing ambiguity that may arise due to the derived APS having the same APS identifier as another APS in the same access unit.

Extending the idea of the fifth aspect, if the APS ID for the derived (associated) APS in an AU has an ID equal to an ID of any APS that is used in the AU for filtering, then such an APS shall have the same content as the existing APS with the same ID. In other words, a new APS with the same ID can be signaled, but the new APS must have the same content (e.g., filter coefficients).

Thus, in accordance with the example above, video encoder 200 may include, in a bitstream that includes an encoded representation of video data, an APS associated with an access unit. In this example, a constraint prohibits the APS associated with the access unit from having an APS identifier equal to any APS identifier used in the access unit unless the APS associated with the access unit has the same content as an existing APS used in the access unit with the same APS identifier. In this example, video encoder 200 may encode pictures of a subsequent access unit based on the APS associated with the access unit. Similarly, in some examples, video decoder 300 may obtain, from a bitstream that includes an encoded representation of the video data, an APS associated with an access unit, wherein a constraint prohibits the APS associated with the access unit from having an APS identifier equal to any APS identifier used in the access unit unless the APS associated with the access unit has the same content as an existing APS used in the access unit with the same APS identifier. In this example, video decoder 300 may decode pictures of a subsequent access unit based on the APS associated with the access unit, his constraint may help to ensure that the results of decoding pictures referring to the APS's within an access unit with the same APS identifier do not change because one or more of these APS's are removed in a sub-bitstream extraction process.

In one example, a flag/syntax element (e.g., aps_disallowed_for_curr_pic) may be signaled in the APS in the AU to specify that the signaled APS in the AU may not be used by the current picture, and will be applied to the next picture in decoding order. Alternatively, such a restriction may apply at the access unit level rather than the picture level. In this case, a mismatch between video encoder 200 and video decoder 300 can be avoided when APS content is overwritten in the current picture and the to-be-overwritten APS is used by the current picture, because any APS must be signaled before the first VCL NAL unit of the picture.

Furthermore, in some examples, a bitstream constraint may be added to disallow the current picture from using an APS with aps_disallowed_for_curr_pic equal to 1 that is present in the current access unit. If the APS has aps_disallowed_for_curr_pic equal to 1 in a different access unit, the current picture may be allowed to use it. Alternatively, a bitstream constraint may be added that specifies that an APS that is associated with a picture and that is present in the same AU as the picture shall not have aps_disallowed_for_curr_pic equal to 1.

In some examples, the value of aps_disallowed_for_curr_pic may delay the activation of the APS. In this case, the APS signaled in the AU will not be activated by this AU, i.e., the APS cannot be used for this AU decoding.

In some examples, constraints may be added to specify that APS's that are sent by external means/outside the bitstream shall have aps_disallowed_for_curr_pic equal to 0. Such constraints may be included in the VVC specification, or in other specifications at the systems layer.

Furthermore, in some examples, video encoder 200 may generate an APS that includes a syntax element (e.g., aps_disallowed_for_curr_pic). In this example, the APS is in an access unit of the video data and the syntax element indicates whether the APS is usable by a current picture in the access unit. In this example, when the syntax element indicates that the APS is not usable by the current picture, the APS is usable by a next picture in decoding order. In this example, video encoder 200 may encode pictures of a subsequent access unit of the video data based on the APS associated with the access unit. Similarly, in some examples, video decoder 300 may obtain an APS that includes a syntax element (e.g., aps_disallowed_for_curr_pic). In such examples, the APS is in an access unit of the video data and the syntax element indicates whether the APS is usable by a current picture in the access unit. When the syntax element indicates that the APS is not usable by the current picture, the APS is usable by a next picture in decoding order. In this example, video decoder 300 may decode pictures of a subsequent access unit of the video data based on the APS associated with the access unit. In these examples, a bitstream constraint may disallow the current picture from using the APS when the syntax element indicates that the APS is not usable by the current picture.

Furthermore, in these examples, a bitstream constraint may require that if the APS is associated with the current picture and that the APS is present in the same access unit has the current picture, the syntax element shall not indicate that the APS is not usable by the current picture. In these examples, based on the syntax element indicating that the APS is not usable by the current picture, video encoder 200 or video decoder 300 may delay activation of the APS until a next access unit. In some such examples, video encoder 200 may generate the APS in a bitstream that includes an encoded representation of the video data. Similarly, video decoder 300 may obtain the APS from a bitstream that includes an encoded representation of the video data. In some examples, based on the APS having been obtained from the external system or from outside the bitstream, a constraint requires the syntax element to specify that the APS is not usable by the current picture.

APS's belonging to different APS types may include different syntax elements. For instance, the APS types may include ALF APS's, LMCS APS's, and scaling APS's. ALF APS's are APS's that include syntax elements associated with adaptive loop filtering. LMCS APS's are APS's that include syntax elements associated with LMCS. The APS type of an APS may be specified by an APS parameters type (e.g., aps_params_type) syntax element. In some examples, a constraint may be added that an access unit may not (e.g., shall not) contain more than a threshold T number of APS NAL units. The value of T may be fixed or may depend on an APS type. Thus, in this example, video encoder 200 may generate a bitstream that includes an encoded representation of the video data. In this example, a constraint specifies that no access unit of the video data can contain more than a threshold number of APS NAL units. In this example, video decoder 300 may obtain a bitstream that includes an encoded representation of the video data. Furthermore, in this example, a constraint specifies that no access unit of the video data can contain more than a threshold number of APS NAL units. In this example, video decoder 300 may decode pictures based on the bitstream. For instance, video decoder 300 may decode pictures based on the bitstream as described with respect to FIG. 4. Imposing the constraint on the number of APSs used in an AU limits the total memory required to store such APSs.

In some examples, a constraint may be added to specify that an access unit may not contain more than a threshold T number of APS NAL units of a particular adaptation_parameter_set_id, where the threshold T may be a function of the adaptation_parameter_set_id, APS types, etc. Thus, in this example, video encoder 200 may generate a bitstream that includes an encoded representation of the video data, wherein a constraint specifies that no access unit of the video data can contain more than a threshold number of APS NAL units of a particular APS identifier. In this example, video decoder 300 may obtain a bitstream that includes an encoded representation of the video data, wherein a constraint specifies that no access unit of the video data can contain more than a threshold number of APS NAL units of a particular APS identifier. In this example, video decoder 300 may decode pictures based on the bitstream. For instance, video decoder 300 may decode pictures based on the bitstream as described with respect to FIG. 4.

In some examples, another constraint is added to APS usage with different layer IDs. For example, there can be multiple layers, and in VVC Draft 5, an APS from one layer can be used in another layer even when the layers are independently decoded. In such case, if one layer is removed from the bitstream (sub-bitstream extraction), when an APS with that layer is also removed, but the APS may be used in the other layer, the sub-bitstream is not decodable.

Hence, in accordance with an example of this disclosure, a constraint may be added that a picture with a layer ID can only use an APS corresponding to that layer ID. In another example, a picture with a layer ID can only use an APS corresponding to that layer ID and APS corresponding to a layer ID of a layer, which may be used to predict the current layer. Such layers may be called "direct layers" or "dependent layers."

For example, there may be two layers (i.e., layer0 and layer1), and layer1 may use pictures of layer0 for the prediction. In this example, with the first example constraint, layer0 may only use the layer0 APS, and layer1 may only use the layer1 APS. In a second example constraint, layer0 may only use layer0 APSs, and layer1 may use layer0 APSs and layer1 APSs. In VVC Draft 5, a slice header may include a slice_alf_aps_id_luma syntax element and a slice_alf_aps_id_chroma syntax element, among other syntax elements. The following text enclosed in <C1> . . . </C1> tags corresponds to the first example constraint and text enclosed in <C2> . . . </C2> tags corresponds to a second example constraint proposed in this disclosure.

slice_alf_aps_id_luma[i] specifies the adaptation_parameter_set_id of the i-th ALF APS that the slice refers to. The TemporalId of the ALF APS NAL unit having adaptation_parameter_set_id equal to slice_alf_aps_id_luma[i] shall be less than or equal to the TemporalId of the coded slice NAL unit.

When multiple ALF APSs with the same value of adaptation_parameter_set_id are referred to by two or more slices of the same picture, the multiple ALF APSs with the same value of adaptation_parameter_set_id shall have the same content.

<C1> The nuh_layer_id of the ALF APS NAL unit having adaptation_parameter_set_id equal to slice_alf_aps_id_luma[i] shall be equal to the nuh_layer_id of the coded slice NAL unit</C1><C2> or the nuh_layer_id of any layer, which is used to predict the current layer.</C2>

For intra slices and slices in an IRAP picture, slice_alf_aps_id_luma[i] shall not refer to an ALF APS associated with other pictures rather than the picture containing the intra slices or the IRAP picture.

slice_alf_aps_id_chroma specifies the adaptation_parameter_set_id that the chroma component of the slice refers to. When slice_alf_aps_id_chroma is not present, it is inferred to be equal to slice_alf_aps_id_luma[0]. The TemporalId of the ALF APS NAL unit having adaptation_parameter_set_id equal to slice_alf_aps_id_ chroma shall be less than or equal to the TemporalId of the coded slice NAL unit.

<C1>The nuh_layer_id of the ALF APS NAL unit having adaptation_parameter_set_id equal to slice_alf_aps_id_chroma shall be equal to the nuh_layer_id of the coded slice NAL unit</C1><C2> or the nuh_layer_id of any layer, which is used to predict the current layer.</C2>

<C1>In one alternative, the nuh_layer_id of the ALF APS NAL unit having adaptation_parameter_set_id equal to slice_alf_aps_id_chroma shall be </C1><C2>less than or </C2><C1> equal to the nuh_layer_id of the coded slice NAL unit</C1>

For intra slices and slices in an IRAP picture, slice_alf_aps_id_chroma shall not refer to an ALF APS associated with other pictures rather than the picture containing the intra slices or the IRAP picture.

It also proposed to include a similar adaptation_parameter_set_id constraint present in slice_alf_aps_id_luma to slice_alf_aps_id_chroma. For example, the following language may be added to the slice_alf_aps_id_chroma semantics:

<C1>When multiple ALF APSs with the same value of adaptation_parameter_set_id are referred to by two or more slices of the same picture, the multiple ALF APSs with the same value of adaptation_parameter_set_id shall have the same content.</C1>

In some examples, the constraint may apply to two or more slice of an access unit instead of two or more slices of a picture, as described in the example above. For instance, the following language may be added to the slice_alf_aps_id_chroma semantics:

<C1>When multiple ALF APSs with the same value of adaptation_parameter_set_id are referred to by two or more slices of the access unit, the multiple ALF APSs with the same value of adaptation_parameter_set_id shall have the same content.</C1>

In some examples, rather than the constraint applying when two or more slices in an access unit or picture refer to multiple ALF APSs with the same value of adaptation_parameter_set_id, the constraint may apply when there are simply two or more ALF APS's within the same access unit. That is, a constraint may require that when more than one ALF APS with the same value of adaptation_parameter_set_id is present in an access unit, the contents of the ALF APS shall be the same.

Thus, in accordance with the techniques of this disclosure, video encoder 200 may determine ALF parameters and include, in a bitstream that includes an encoded representation of the video data, a coded slice NAL unit for a slice of a picture of a current layer of the video data. In this example, the coded slice NAL unit includes a syntax element that specifies an identifier of an ALF APS to which the slice refers. In this example, a constraint applied to the syntax element prohibits the syntax element from ever specifying a layer identifier of any ALF APS NAL unit that is unequal to a layer identifier of the coded slice NAL unit, wherein the ALF APS includes data representing the ALF parameters. Furthermore, in this example, video encoder 200 may use the ALF parameters to apply an ALF to a block of the slice. In this example, the slice may be an inter slice, an intra slice, or another type of slice. In this example, the syntax element may, in some instances, specify the identifier of the ALF APS that a chroma component of the slice refers to (e.g., the syntax element may be a slice_alf_aps_id_chroma) syntax element. In other instances, the syntax element may be a slice_alf_aps_id_luma syntax element.

In some examples of this disclosure, video encoder 200 may determine ALF parameters and may include, in a bitstream that includes an encoded representation of the video data, a coded slice NAL unit for a slice of a picture of a current layer of the video data. The coded slice NAL unit includes a syntax element that specifies an identifier of an ALF APS to which the slice refers. A constraint applied to the syntax element prohibits the syntax element from ever specifying a layer identifier of any ALF APS NAL unit that is unequal to a layer identifier of the coded slice NAL unit or a layer identifier of a layer used to predict the current layer. The ALF APS includes data representing the ALF parameters. In this example, video encoder 200 may use the ALF parameters to apply an ALF to a block of the slice. In this example, the slice may be an inter slice, an intra slice, or another type of slice. In this example, the syntax element may, in some instances, specify the identifier of the ALF APS that a chroma component of the slice refers to (e.g., the syntax element may be a slice_alf_aps_id_chroma syntax element). In other instances, the syntax element may be a slice_alf_aps_id_luma syntax element.

Furthermore, in some examples, video decoder 300 may obtain, from a bitstream that includes an encoded representation of the video data, a coded slice NAL unit for a slice of a picture of a current layer of the video data, the coded slice NAL unit including a syntax element that specifies an identifier of an ALF APS to which the slice refers. In this example, a constraint applied to the syntax element prohibits the syntax element from ever specifying a layer identifier of any ALF APS NAL unit that is unequal to a layer identifier of the coded slice NAL unit. Video decoder 300 may determine ALF parameters based on the ALF APS and use the determined ALF parameters to apply an ALF to a block of the slice. In this example, video decoder 300 may determine that the bitstream is a non-conforming bitstream in response to determining that the syntax element specifies a layer identifier of an ALF APS NAL unit that is unequal to the layer identifier of the coded slice NAL unit. In this example, the slice may be an inter slice, an intra slice, or another type of slice. In this example, the syntax element may, in some instances, specify the identifier of the ALF APS that a chroma component of the slice refers to (e.g., the syntax element may be a slice_alf_aps_id_chroma) syntax element. In other instances, the syntax element may be a slice_alf_aps_id_luma syntax element.

In some examples of this disclosure, video decoder 300 may obtain, from a bitstream that includes an encoded representation of the video data, a coded slice NAL unit for a slice of a picture of a current layer of the video data. The coded slice NAL unit includes a syntax element that specifies an identifier of an ALF APS to which the slice refers. A constraint applied to the syntax element prohibits the syntax element from ever specifying a layer identifier of any ALF APS NAL unit that is unequal to a layer identifier of the coded slice NAL unit or a layer identifier of a layer used to predict the current layer. Video decoder 300 may determine ALF parameters based on the ALF APS and may use the determined ALF parameters to apply an ALF to a block of the slice. In this example, video decoder 300 may be configured to determine that the bitstream is a non-conforming bitstream in response to determining that the syntax element specifies a layer identifier of an ALF APS NAL unit that is unequal to the layer identifier of the coded slice NAL unit and unequal to a layer identifier of any layer used to predict the current layer. The slice may be an inter slice, an intra slice, or another type of slice. In this example, the syntax element may, in some instances, specify the identifier of the ALF APS that a chroma component of the slice refers to (e.g., the syntax element may be a slice_alf_aps_id_chroma syntax element). In other instances, the syntax element may be a slice_alf_aps_id_luma syntax element.

The same idea of not allowing the usage of other layer APS's can be applied to other APS types, such as the luma mapping and chroma scaling (LMCS) APS type. VVC Draft 5 specifies that a slice header may include a slice_lmcs_aps_id syntax element that specifies an APS ID of an applicable LMCS APS. VVC Draft 5 specifies that following semantics for the slice_lmcs_aps_id syntax element.

slice_lmcs_aps_id specifies the adaptation_parameter_set_id of the LMCS APS that the slice refers to. The TemporalId of the LMCS APS NAL unit having adaptation_parameter_set_id equal to slice_lmcs_aps_id shall be less than or equal to the TemporalId of the coded slice NAL unit.

When multiple LMCS APSs with the same value of adaptation_parameter_set_id are referred to by two or more slices of the same picture, the multiple LMCS APSs with the same value of adaptation_parameter_set_id shall have the same content.

In accordance with a technique of this disclosure, when multiple LMCS APSs with the same value of adaptation_parameter_set_id are present in an access unit, the LMCS APSs shall have the same content. Thus, the video coding standard may allow a bitstream to include multiple LMCS APS NAL units within the same AU, with potentially different layer IDs. Accordingly, should a layer including an LMCS APS NAL unit be removed from the bitstream, there may still be an LMCS APS NAL unit in the access unit that is available and because the LMCS APSs have the same content, decoding processes based on the LMCS APS for a remaining layer are not impacted by removal of another LMCS APS NAL unit in the same access unit.

In some examples, the constraint labeled below with <C1> . . . </C1> may be added to the video coding standard. In some examples, the constraint may include the additional text labeled <C2> . . . </C2>.

<C1>The nuh_layer_id of the LMCS APS NAL unit having adaptation_parameter_set_id equal to slice_lmes_aps_id shall be equal to the nuh_layer_id of the coded slice NAL unit </C1><C2> or the nuh_layer_id of any layer which is used to predict the current layer.</C2>

Imposition of this constraint may ensure that an LMCS APS applicable to a coded slice NAL unit is available even if specific layers are removed from the bitstream. This may prevent decoding errors that may occur when an LMCS APS applicable to a coded slice NAL unit is not available.

In some examples, the constraint labeled below with <C1> . . . </C1> may be added to the video coding standard. In some examples, the constraint may include the additional text labeled <C2> . . . </C2>.

<C1>The nuh_layer_id of the LMCS APS NAL unit having adaptation_parameter_set_id equal to slice_lmes_aps_id shall be equal to the nuh_layer_id of the coded slice NAL unit</C1><C2> or the nuh_layer_id of any layer which may be used to predict the current layer.</C2>

This C2 constraint differs from the C2 constraint of the previous example in that the layer of the LMCS APS NAL unit is not required to be among the layers that are actually used to predict the current layer, but rather may be among the layers that could be used to predict the current layer. Allowing the layer of the LMCS APS NAL unit to be in any layer that could be used to predict the current layer may enable greater flexibility for video encoder 200 in placing the LMCS APS NAL unit, which may lead to greater coding efficiency in an original bitstream, but may result in an extracted sub-bitstream including layers that may otherwise be removed.

In some examples, the constraint labeled below with <C1> . . . </C1> may be added to the video coding standard. In some examples, the constraint may include the additional text labeled <C2> . . . </C2>.

<C1>The nuh_layer_id of the LMCS APS NAL unit having adaptation_parameter_set_id equal to slice_lmcs_aps_id shall be </C><C2>less than or </C2><C> equal to the nuh_layer_id of the coded slice NAL unit.</C1>

The C2 constraint above differs from the C2 constraint of the previous example in that the layer of the LMCS APS NAL unit does not necessarily have to be among the layers that could be used to predict the current layer, but rather may be any layer having a layer ID less than the layer ID of the current layer. Allowing the layer of the LMCS APS NAL unit to be in any layer having a layer ID less than the layer ID of the current layer may enable greater flexibility for video encoder 200 in placing the LMCS APS NAL unit, which may lead to greater coding efficiency in an original bitstream, but may result in an extracted sub-bitstream including layers that may otherwise be removed.

Thus, in accordance with a technique of this disclosure, video encoder 200 may obtain video data from a video source. Additionally, video encoder 200 may perform an encoding process that encodes the video data according to a video coding standard. As part of performing the encoding process, video encoder 200 may generate a LMCS APS identifier syntax element for a coded slice NAL unit. The LMCS APS identifier syntax element for the coded slice NAL unit may be included in the coded slice NAL unit, in a picture header applicable to the coded slice NAL unit, or elsewhere. The LMCS APS identifier syntax element specifies a layer identifier of a LMCS APS NAL unit. In this example, the video coding standard imposes a constraint on the encoding process that requires the layer identifier of the LMCS APS NAL unit to be equal to a layer identifier of the coded slice NAL unit or equal to a layer identifier of any layer that is allowed to be used to predict a layer of the coded slice NAL unit.

Similarly, in accordance with a technique of this disclosure, a device (e.g., such as destination device 106, video decoder 300, etc.) may obtain a bitstream that comprises an encoded representation of the video data. In this example, the device may determine that the bitstream does not satisfy a constraint imposed by a video coding standard based on a layer identifier of an applicable LMCS APS NAL unit not being equal to a layer identifier of the coded slice NAL unit and not being equal to a layer identifier of any layer that is allowed to be used to predict a layer of the coded slice NAL unit. In this example, the applicable LMCS APS NAL unit has an APS identifier specified by a LMCS APS identifier syntax element for the coded slice NAL unit.

An alternative solution to the layer ID restriction in APS may be the modification of a sub-bitstream extraction process. The sub-bitstream extraction process is a process to remove NAL units associated with specific layers and/or temporal sub-layers from a bitstream. The NAL units remaining in the bitstream form an extracted sub-bitstream that may be decoded with reference to information in the removed NAL units. The sub-bitstream extraction process may occur in a video decoder (e.g., video decoder 300), a destination device (e.g., destination device 116), or another type of device that obtains the bitstream.

In accordance with a technique of this disclosure, when layer extraction happens as part of performing the sub-bitstream extraction process, APS NAL units are not removed from the bitstream, i.e., other layer APS's are present in the extracted sub-bitstream, so the APS can be referenced across layers. In one example, the VVC Draft 5 is modified as follows, with <!> . . . </!> marking the modification:

The output sub-bitstream is derived as follows:
Remove all NAL units with TemporalId greater than tIdTarget.
Remove all NAL units <!>except APS NAL units</!> with NuhLayerId not equal to lIdTarget.

In this way, an APS NAL unit may remain available in the extracted sub-bitstream even if the APS NAL unit is in a layer that would otherwise be removed in the sub-bitstream extraction process. This may help to prevent decoding errors and/or improve scaling. Improved scaling may allow devices to better manage bandwidth or adjust to the capability of decoding devices.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
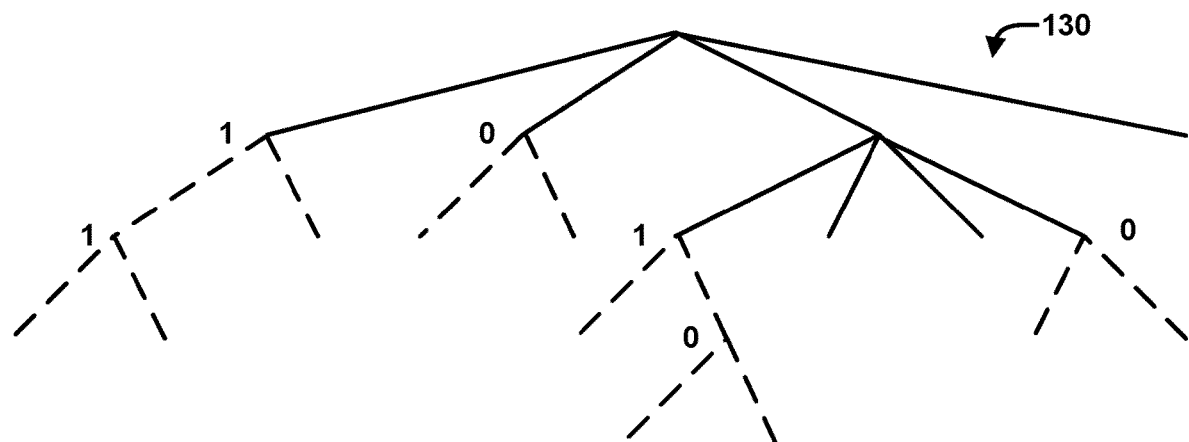
FIGS. 2A and 2B are conceptual diagrams illustrating an example quadtree binary tree (QTBT) structure, and a corresponding coding tree unit (CTU).
Figure 2B:
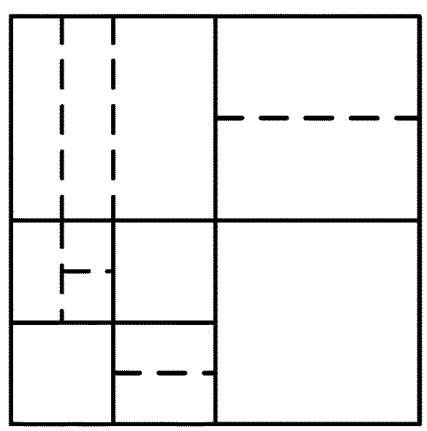

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tre level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tre leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tre node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

Figure 3:
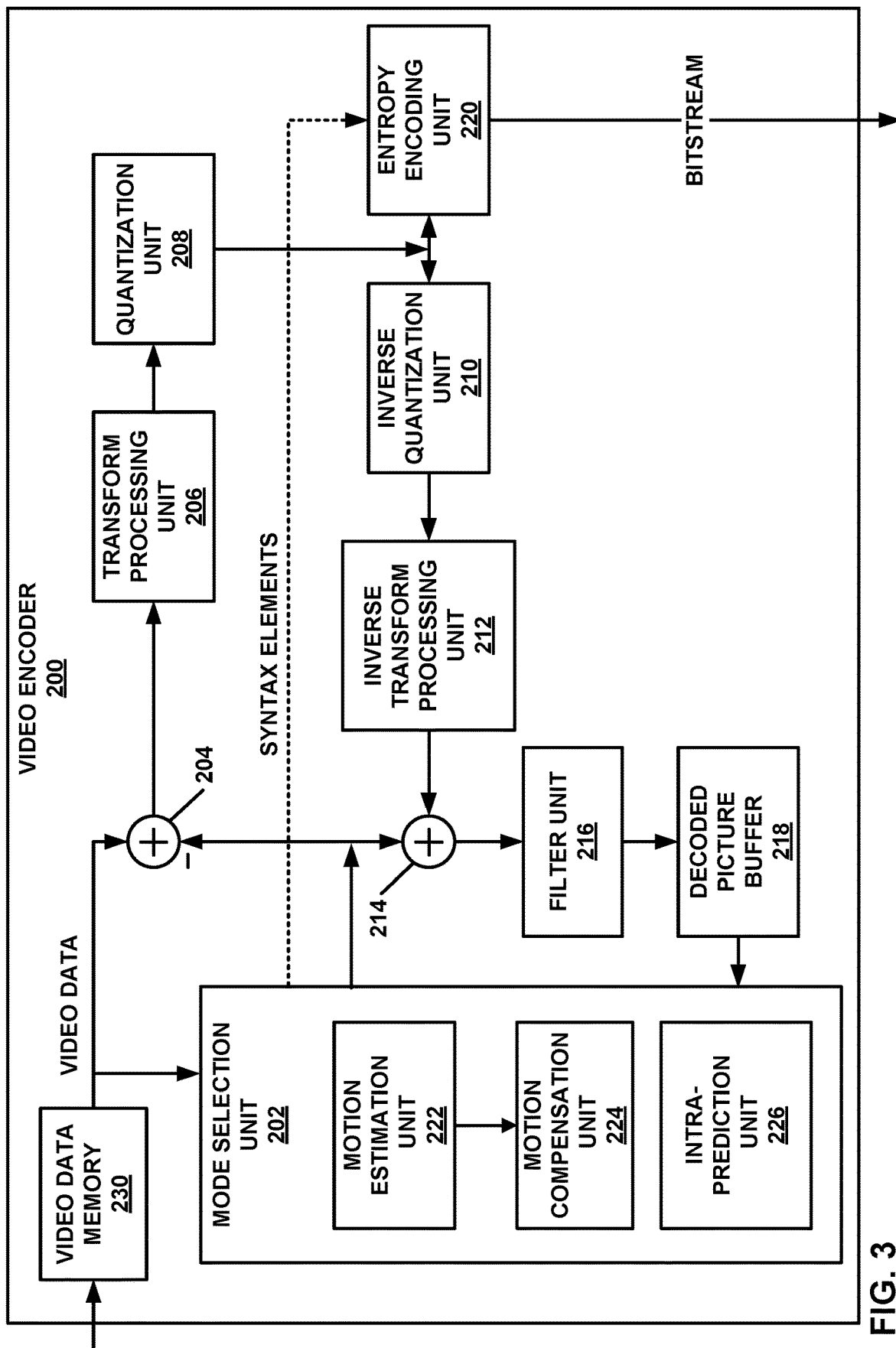
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the H.265 (HEVC) video coding standard and the H.266 (VVC) video coding standard in development. However, the techniques of this disclosure are not limited to these video coding standards and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 may represent an example of a device configured to encode video data including a memory configured to store video data, and one or more processing units implemented in circuitry and configured to obtain a bitstream that comprises an encoded representation of the video data. The one or more processors may be further configured to determine that the bitstream does not satisfy a constraint imposed by a video coding standard based on a layer identifier of an applicable LMCS APS NAL unit not being equal to a layer identifier of the coded slice NAL unit and not being equal to a layer identifier of any layer that is allowed to be used to predict a layer of the coded slice NAL unit. The applicable LMCS APS NAL unit has an APS identifier specified by a LMCS APS identifier syntax element for the coded slice NAL unit.

In some examples, video encoder 200 may represent an example of a device configured to encode video data including a memory configured to store video data, and one or more processing units implemented in circuitry and configured to determine ALF parameters. In this example, the processing units may include, in a bitstream that includes an encoded representation of the video data, a coded slice NAL unit for a slice of a picture of a current layer of the video data. In this example, the coded slice NAL unit includes a syntax element that specifies an identifier of an ALF APS to which the slice refers. In this example, a constraint applied to the syntax element prohibits the syntax element from ever specifying a layer identifier of any ALF APS NAL unit that is unequal to a layer identifier of the coded slice NAL unit, wherein the ALF APS includes data representing the ALF parameters. Furthermore, in this example, the processing units may use the ALF parameters to apply an ALF to a block of the slice. In this example, the slice may be an inter slice, an intra slice, or another type of slice. In this example, the syntax element may, in some instances, specify the identifier of the ALF APS that a chroma component of the slice refers to (e.g., the syntax element may be a slice_alf_aps_id_chroma syntax element). In other instances, the syntax element may be a slice_alf_aps_id_luma syntax element.

In some examples of this disclosure, the one or more processing units of video encoder 200 may determine ALF parameters and include, in a bitstream that includes an encoded representation of the video data, a coded slice NAL unit for a slice of a picture of a current layer of the video data. The coded slice NAL unit includes a syntax element that specifies an identifier of an ALF APS to which the slice refers. A constraint applied to the syntax element prohibits the syntax element from ever specifying a layer identifier of any ALF APS NAL unit that is unequal to a layer identifier of the coded slice NAL unit or a layer identifier of a layer used to predict the current layer. The ALF APS includes data representing the ALF parameters. In this example, the one or more processing units may use the ALF parameters to apply an ALF to a block of the slice. In this example, the slice may be an inter slice, an intra slice, or another type of slice. In this example, the syntax element may, in some instances, specify the identifier of the ALF APS that a chroma component of the slice refers to (e.g., the syntax element may be a slice_alf_aps_id_chroma syntax element). In other instances, the syntax element may be a slice_alf_aps_id_luma syntax element.

In some examples of this disclosure, the one or more processing units of video encoder 200 may include, in a bitstream that includes an encoded representation of the video data, an APS NAL unit. Additionally, in this example, the one or more processing units may include, in the bitstream, a VCL NAL unit that follows the APS NAL unit in the bitstream. In this example, the VCL NAL unit belongs to the same access unit as the APS NAL unit. Furthermore, in some examples of this disclosure, the one or more processing units of video encoder 200 may include, in a bitstream that includes an encoded representation of the video data, a series of NAL units that includes VCL NAL units with a same POC value interleaved with APS NAL units within an access unit.

Figure 4:
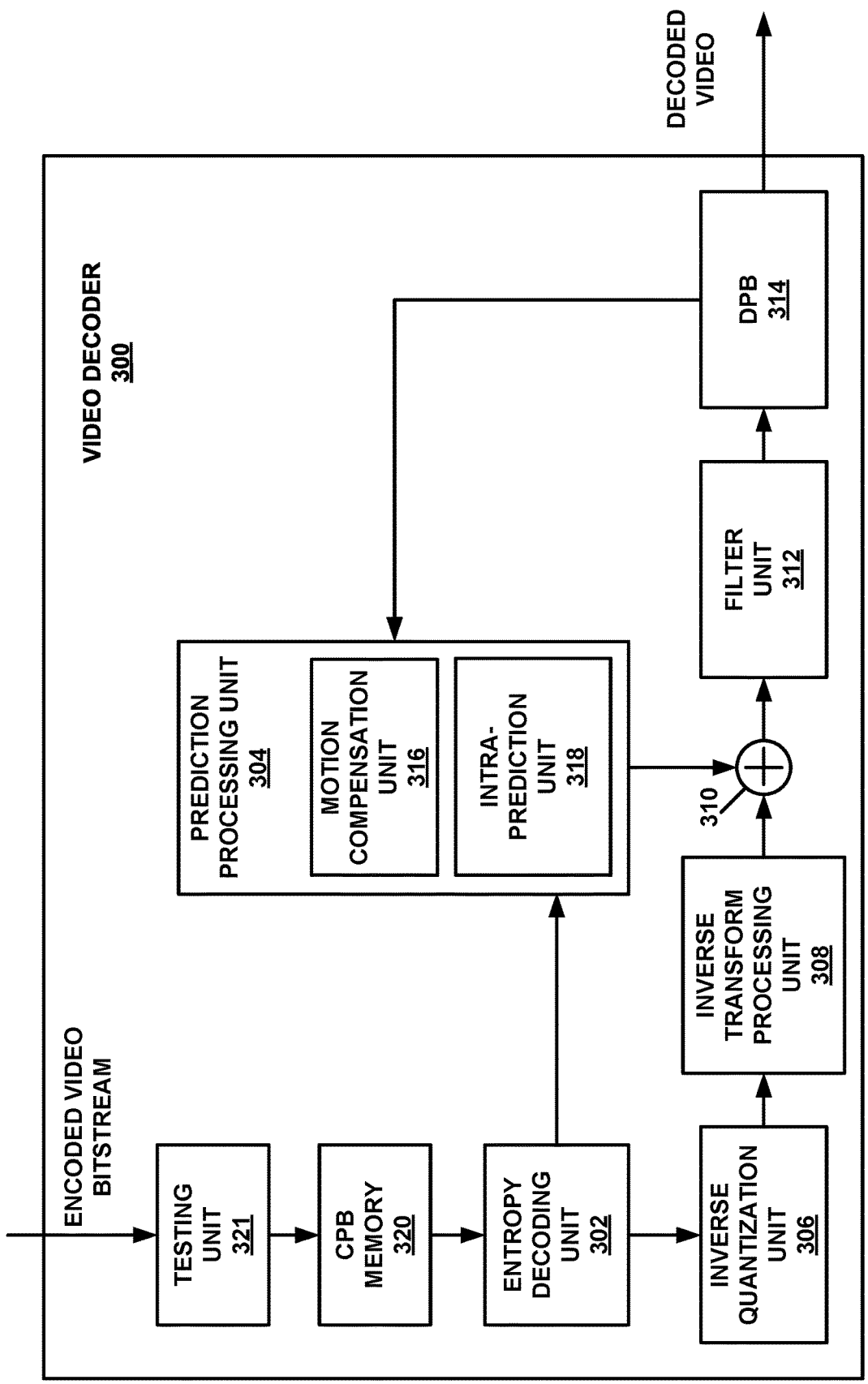
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of H.266 (VVC) and H.265 (HEVC). However, the techniques of this disclosure may be performed by video coding devices that are configured to other video coding standards.

In the example of FIG. 4, video decoder 300 includes a testing unit 321, a coded picture buffer (CPB) memory 320, an entropy decoding unit 302, a prediction processing unit 304, an inverse quantization unit 306, an inverse transform processing unit 308, a reconstruction unit 310, a filter unit 312, and a decoded picture buffer (DPB) 314. Any or all of testing unit 321, CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Testing unit 321 may obtain a bitstream that includes an encoded representation of the video data (i.e., encoded video data). Testing unit 321 may perform a bitstream conformance test that determines whether the bitstream conforms to a video coding standard, such as VVC. In accordance with a technique of this disclosure, as part of performing the bitstream conformance test, testing unit 321 may determine that the bitstream does not satisfy a constraint imposed by the video coding standard based on a layer identifier of a LMCS APS NAL unit having an APS identifier specified by a LMCS APS identifier syntax element for a coded slice NAL unit not being equal to a layer identifier of the coded slice NAL unit and not being equal to a layer identifier of any layer that is allowed to be used to predict a layer of the coded slice NAL unit.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In some examples, video decoder 300 may be included in a device (e.g., destination device 116) that includes a memory configured to store video data, and one or more processing units implemented in circuitry and configured to obtain a bitstream that comprises an encoded representation of the video data. The one or more processing units may be further configured to determine that the bitstream does not satisfy a constraint imposed by a video coding standard based on a layer identifier of an applicable LMCS APS NAL unit not being equal to a layer identifier of the coded slice NAL unit and not being equal to a layer identifier of any layer that is allowed to be used to predict a layer of the coded slice NAL unit. In such examples, the applicable LMCS APS NAL unit has an APS identifier specified by a LMCS APS identifier syntax element for the coded slice NAL unit. In some examples, video decoder 300 of FIG. 4 may decode the bitstream based on a determination that the bitstream satisfies the constraint.

Furthermore, in some examples, video decoder 300 represents an example of a video decoding device including a memory configured to store video data, and one or more processing units implemented in circuitry and configured to obtain, from a bitstream that includes an encoded representation of the video data, a coded slice NAL unit for a slice of a picture of a current layer of the video data, the coded slice NAL unit including a syntax element that specifies an identifier of an ALF APS to which the slice refers. In this example, a constraint applied to the syntax element prohibits the syntax element from ever specifying a layer identifier of any ALF APS NAL unit that is unequal to a layer identifier of the coded slice NAL unit. The one or more processing units may determine ALF parameters based on the ALF APS and use the determined ALF parameters to apply an ALF to a block of the slice. In this example, the one or more processing units of video decoder 300 may determine that the bitstream is a non-conforming bitstream in response to determining that the syntax element specifies a layer identifier of an ALF APS NAL unit that is unequal to the layer identifier of the coded slice NAL unit. In this example, the slice may be an inter slice, an intra slice, or another type of slice. In this example, the syntax element may, in some instances, specify the identifier of the ALF APS that a chroma component of the slice refers to (e.g., the syntax element may be a slice_alf_aps_id_chroma syntax element).

In other instances, the syntax element may be a slice_alf_aps_id_luma syntax element.

In some examples of this disclosure, the one or more processing units of video decoder 300 are configured to obtain, from a bitstream that includes an encoded representation of the video data, a coded slice NAL unit for a slice of a picture of a current layer of the video data. The coded slice NAL unit includes a syntax element that specifies an identifier of an ALF APS to which the slice refers. A constraint applied to the syntax element prohibits the syntax element from ever specifying a layer identifier of any ALF APS NAL unit that is unequal to a layer identifier of the coded slice NAL unit or a layer identifier of a layer used to predict the current layer. The one or more processing units may determine ALF parameters based on the ALF APS and use the determined ALF parameters to apply an ALF to a block of the slice. In this example, the processing units may be configured to determine that the bitstream is a non-conforming bitstream in response to determining that the syntax element specifies a layer identifier of an ALF APS NAL unit that is unequal to the layer identifier of the coded slice NAL unit and unequal to a layer identifier of any layer used to predict the current layer. The slice may be an inter slice, an intra slice, or another type of slice. In this example, the syntax element may, in some instances, specify the identifier of the ALF APS that a chroma component of the slice refers to (e.g., the syntax element may be a slice_alf_aps_id_chroma syntax element). In other instances, the syntax element may be a slice_alf_aps_id_luma syntax element.

In some examples of this disclosure, the one or more processing units of video decoder 300 may obtain, from a bitstream that includes an encoded representation of the video data, an APS NAL unit and obtain, from the bitstream, a VCL NAL unit that follows the APS NAL unit in the bitstream. In this example, the processing units may determine that the VCL NAL unit belongs to the same access unit as the APS NAL unit. Additionally, the processing units may decode a slice of a picture of the video data based on the VCL NAL unit and the APS NAL unit.

In some examples of this disclosure, the one or more processing units of video decoder 300 may obtain, from a bitstream that includes an encoded representation of the video data, a series of NAL units that includes VCL NAL units with a same POC value interleaved with APS NAL units within an access unit. In this example, the processing units may decode pictures of the access unit based on the VCL NAL units and the APS NAL units.

In some examples, the one or more processing units of video decoder 300 may determine that the bitstream does not satisfy a constraint imposed by the video coding standard based on a layer identifier of a LMCS APS NAL unit having an APS identifier specified by a LMCS APS identifier syntax element for a coded slice NAL unit not being equal to a layer identifier of the coded slice NAL unit and not being equal to a layer identifier of any layer that is allowed to be used to predict a layer of the coded slice NAL unit.

Figure 5:
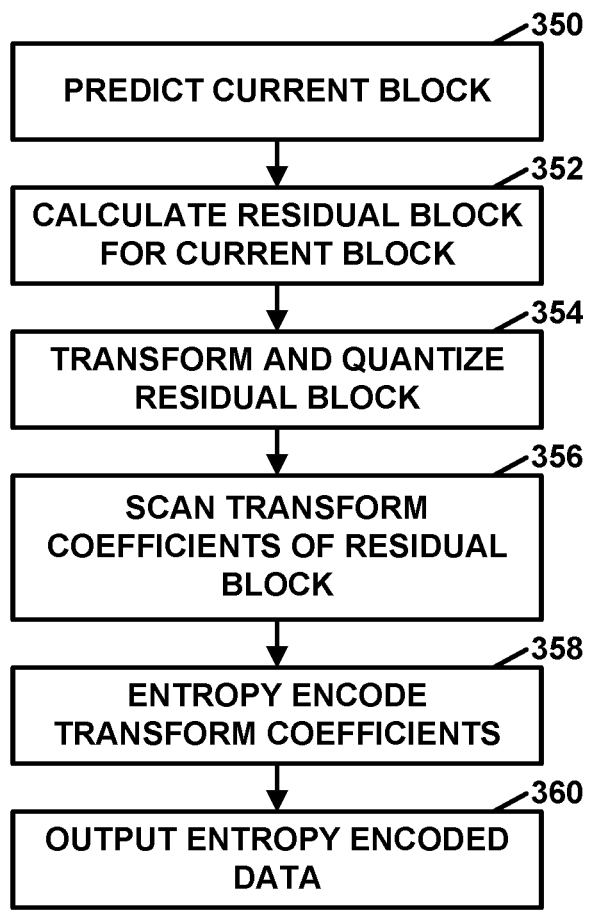
FIG. 5 is a flowchart illustrating an example method for encoding a current block.

FIG. 5 is a flowchart illustrating an example method for encoding a current block. The flowcharts of this disclosure are provided as examples. In other examples, methods that are in accordance with the techniques of this disclosure may include more, fewer, or different actions, or actions that performed in different orders.

In the example of FIG. 5, the current block may include a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 6:
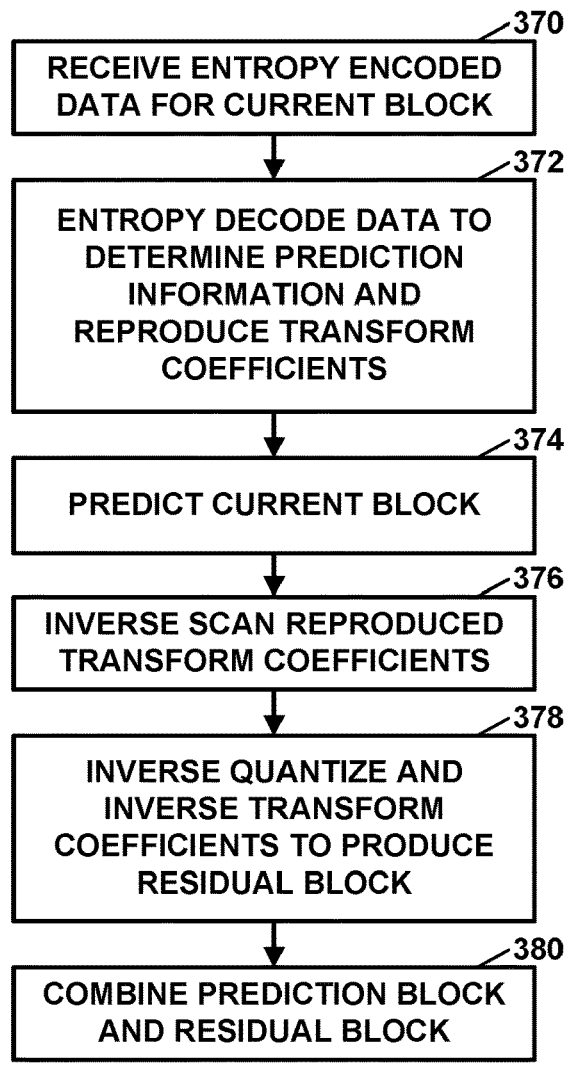
FIG. 6 is a flowchart illustrating an example method for decoding a current block of video data.

FIG. 6 is a flowchart illustrating an example method for decoding a current block of video data. The current block may include a current CU. Although described with respect to video decoder 300 (FIGS. 1 and 4), it should be understood that other devices may be configured to perform a method similar to that of FIG. 6.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 7:
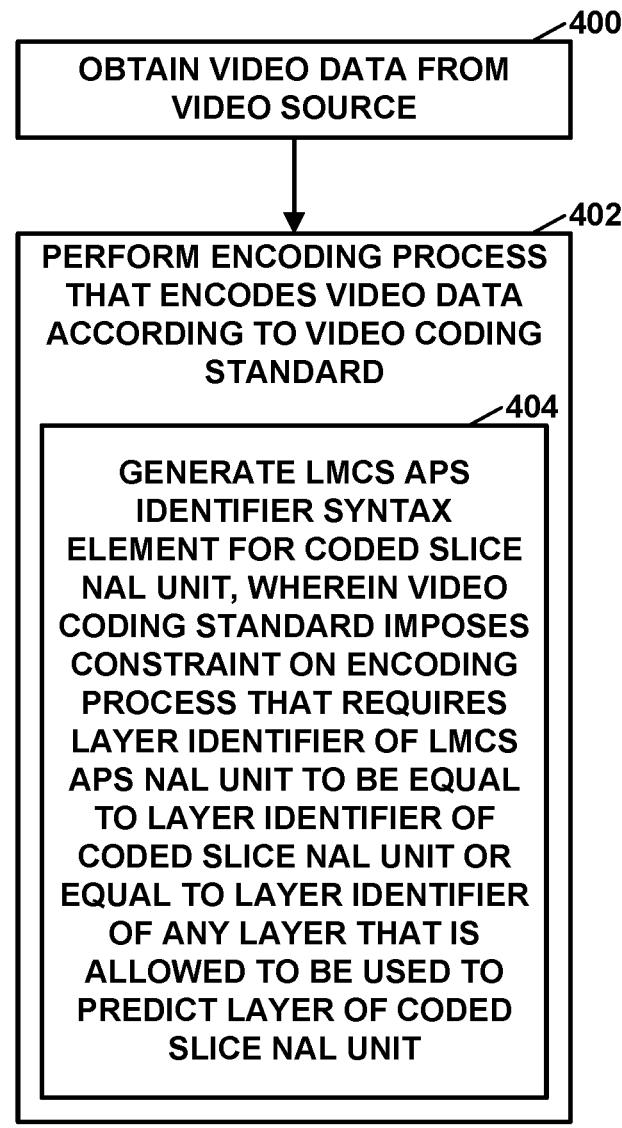
FIG. 7 is a flowchart illustrating an example method for encoding video data, in accordance with one or more techniques of this disclosure.

FIG. 7 is a flowchart illustrating an example method for encoding video data, in accordance with one or more techniques of this disclosure. In the example of FIG. 7, video encoder 200 may obtain video data from a video source, such as video source 104 (400).

Furthermore, in the example of FIG. 7, video encoder 200 may perform an encoding process that encodes the video data according to a video coding standard (402). As part of performing the encoding process, video encoder 200 may generate a LMCS APS identifier syntax element for a coded slice NAL unit (404). In this disclosure, a LMCS APS identifier syntax element for a coded slice NAL unit may be included in the coded slice NAL unit, in a picture header applicable to the coded slice NAL unit, or elsewhere. The LMCS APS identifier syntax element specifies a layer identifier of a LMCS APS NAL unit. The video coding standard imposes a constraint on the encoding process that requires the layer identifier of the LMCS APS NAL unit be equal to a layer identifier of the coded slice NAL unit or equal to a layer identifier of any layer that is allowed to be used to predict a layer of the coded slice NAL unit. Thus, when video encoder 200 generates the LMCS APS identifier syntax element for the coded slice NAL unit, the LMCS APS identifier syntax element for the coded slice NAL unit must be equal to a LMCS APS identifier of an LMCS APS NAL unit that has a layer identifier equal to a layer identifier of the coded slice NAL unit or a layer identifier of a layer that is allowed to be used to predict the layer of the coded slice NAL unit.

Figure 8:
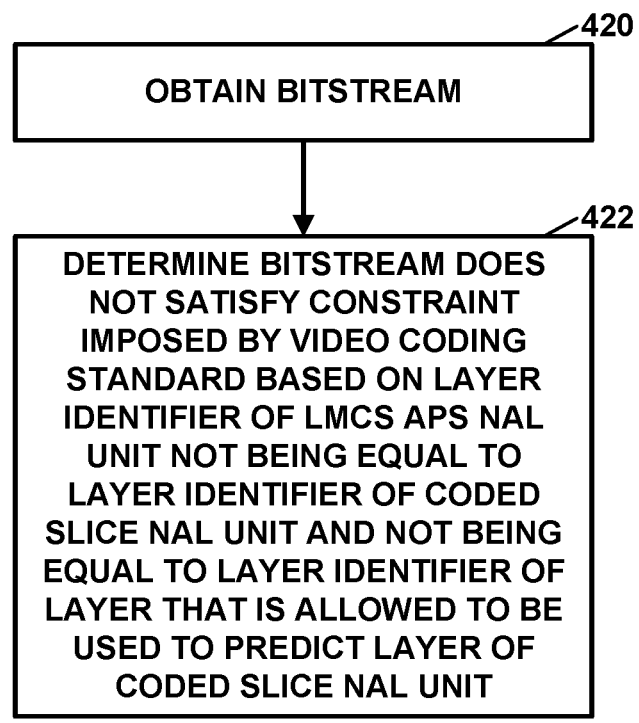
FIG. 8 is a flowchart illustrating an example method for processing video data, in accordance with one or more techniques of this disclosure.

FIG. 8 is a flowchart illustrating an example method for processing video data, in accordance with one or more techniques of this disclosure. The example of FIG. 8 is described with respect to video decoder 300 but may be performed by other devices. In the example of FIG. 8, video decoder 300 may obtain a bitstream that includes an encoded representation of the video data (420). For instance, video decoder 300 may obtain the bitstream from input interface 122 (FIG. 1).

Video decoder 300 may determine that the bitstream does not satisfy a constraint imposed by a video coding standard based on a layer identifier of a LMCS APS NAL unit having an APS identifier specified by a LMCS APS identifier syntax element for a coded slice NAL unit not being equal to a layer identifier of the coded slice NAL unit and not being equal to a layer identifier of any layer that is allowed to be used to predict a layer of the coded slice NAL unit (422). The LMCS APS identifier syntax element for the coded slice NAL unit may be included in the coded slice NAL unit, in a picture header applicable to the coded slice NAL unit, or elsewhere. Video decoder 300 may determine whether the bitstream satisfies the constraint as part of performing a bitstream conformance test that evaluates whether the bitstream conforms to the video coding standard. As part of performing to determine whether applicable constraints imposed by the video coding standard are satisfied, testing unit 321 may perform the bitstream conformance test. In some examples, in response to determining that the bitstream passes the bitstream conformance test, video decoder 300 may decode the bitstream. In some examples, in response to determining that the bitstream does not pass the bitstream conformance test, video decoder 300 may generate an error indicating that the bitstream does not pass the bitstream conformance test.

The following is a non-limiting list of examples that are in accordance with one or more techniques of this disclosure.

Example 1

A method of decoding video data, the method including: obtaining, from a bitstream that includes an encoded representation of the video data, a coded slice Network Abstraction Layer (NAL) unit for a slice of a picture of a current layer of the video data, the coded slice NAL unit including a syntax element that specifies an identifier of an Adaptive Loop Filter (ALF) Adaptation Parameter Set (APS) to which the slice refers, wherein a constraint applied to the syntax element prohibits the syntax element from ever specifying a layer identifier of any ALF APS NAL unit that is unequal to a layer identifier of the coded slice NAL unit, determining ALF parameters based on the ALF APS; and using the determined ALF parameters to apply an ALF to a block of the slice.

Example 2

The method of example 1, wherein the constraint applied to the syntax element requires the syntax element to specify a layer identifier of an ALF APS NAL unit that is equal to the layer identifier of the coded slice NAL unit.

Example 3

The method of any of examples 1-2, further including determining that the bitstream is a non-conforming bitstream in response to determining that the syntax element specifies a layer identifier of an ALF APS NAL unit that is unequal to the layer identifier of the coded slice NAL unit.

Example 4

The method of any of examples 1-3, wherein the slice is an inter slice.

Example 5

The method of any of examples 1-4, wherein the syntax element specifies the identifier of the ALF APS that a chroma component of the slice refers to.

Example 6

A method of decoding video data, the method including: obtaining, from a bitstream that includes an encoded representation of the video data, a coded slice Network Abstraction Layer (NAL) unit for a slice of a picture of a current layer of the video data, the coded slice NAL unit including a syntax element that specifies an identifier of an Adaptive Loop Filter (ALF) Adaptation Parameter Set (APS) to which the slice refers, wherein a constraint applied to the syntax element prohibits the syntax element from ever specifying a layer identifier of any ALF APS NAL unit that is unequal to a layer identifier of the coded slice NAL unit or a layer identifier of a layer used to predict the current layer: determining ALF parameters based on the ALF APS; and using the determined ALF parameters to apply an ALF to a block of the slice.

Example 7

The method of example 6, wherein the constraint applied to the syntax element requires the syntax element to specify a layer identifier of an ALF APS NAL unit that is equal to the layer identifier of the coded slice NAL unit or equal to a layer identifier of a layer used to predict the current layer.

Example 8

The method of any of examples 6-7, further including determining that the bitstream is a non-conforming bitstream in response to determining that the syntax element specifies a layer identifier of an ALF APS NAL unit that is unequal to the layer identifier of the coded slice NAL unit and unequal to a layer identifier of any layer used to predict the current layer.

Example 9

The method of any of examples 6-8, wherein the slice is an inter slice.

Example 10

The method of any of examples 6-9, wherein the syntax element specifies the identifier of the ALF APS that a chroma component of the slice refers to.

Example 11

A method of decoding video data, the method including: obtaining, from a bitstream that includes an encoded representation of the video data, an Adaptation Parameter Set (APS) Network Abstraction Layer (NAL) unit; obtaining, from the bitstream, a Video Coding Layer (VCL) NAL unit that follows the APS NAL unit in the bitstream; determining that the VCL NAL unit belongs to the same access unit as the APS NAL unit; and decoding a slice of a picture of the video data based on the VCL NAL unit and the APS NAL unit.

Example 12

A method of decoding video data, the method including: obtaining, from a bitstream that includes an encoded representation of the video data, a series of Network Abstraction Layer (NAL) units that includes Video Coding Layer (VCL) NAL units with a same Picture Order Count (POC) value interleaved with Adaptive Parameter Set (APS) NAL units within an access unit; and decoding pictures of the access unit based on the VCL NAL units and the APS NAL units.

Example 13

A method of decoding video data, the method including obtaining, from a bitstream that includes an encoded representation of the video data, an Adaptation Parameter Set (APS) associated with an access unit, wherein a constraint prohibits the APS associated with the access unit from having an APS identifier equal to any APS identifier used in the access unit; and decoding pictures of a subsequent access unit based on the APS associated with the access unit.

Example 14

A method of decoding video data, the method including obtaining, from a bitstream that includes an encoded representation of the video data, an Adaptation Parameter Set (APS) associated with an access unit, wherein a constraint prohibits the APS associated with the access unit from having an APS identifier equal to any APS identifier used in the access unit unless the APS associated with the access unit has the same content as an existing APS used in the access unit with the same APS identifier; and decoding pictures of a subsequent access unit based on the APS associated with the access unit.

Example 15

A method of decoding video data, the method including obtaining an Adaptation Parameter Set (APS) that includes a syntax element, wherein the APS is in an access unit of the video data, and the syntax element indicates whether the APS is usable by a current picture in the access unit, wherein when the syntax element indicates that the APS is not usable by the current picture, the APS is usable by a next picture in decoding order; and decoding pictures of a subsequent access unit of the video data based on the APS associated with the access unit.

Example 16

The method of example 15, wherein a bitstream constraint disallows the current picture from using the APS when the syntax element indicates that the APS is not usable by the current picture.

Example 17

The method of example 15, wherein a bitstream constraint requires that if the APS is associated with the current picture and that the APS is present in the same access unit has the current picture, the syntax element shall not indicate that the APS is not usable by the current picture.

Example 18

The method of any of examples 15-17, further including: based on the syntax element indicating that the APS is not usable by the current picture, delaying activation of the APS until a next access unit.

Example 19

The method of any of examples 15-18, wherein obtaining the APS includes obtaining the APS from a bitstream that includes an encoded representation of the video data.

Example 20

The method of any of examples 15-18, wherein: obtaining the APS includes obtaining the APS from an external system or from outside a bitstream that includes an encoded representation of the video data, and based on the APS having been obtained from the external system or from outside the bitstream, a constraint requires the syntax element to specify that the APS is not usable by the current picture.

Example 21

A method of decoding video data, the method including: obtaining a bitstream that includes an encoded representation of the video data, wherein a constraint specifies that no access unit of the video data can contain more than a threshold number of Adaptation Parameter Set (APS) Network Access Layer (NAL) units; and decoding pictures based on the bitstream.

Example 22

A method of decoding video data, the method including: obtaining a bitstream that includes an encoded representation of the video data, wherein a constraint specifies that no access unit of the video data can contain more than a threshold number of Adaptation Parameter Set (APS) Network Access Layer (NAL) units of a particular APS identifier; and decoding pictures based on the bitstream.

Example 23

A method of decoding video data, the method including the methods of any combination of examples 1-22.

Example 24

A method of decoding video data including any combination of one or more of the examples of this disclosure.

Example 25

A method of encoding video data, the method including: determining Adaptive Loop Filter (ALF) parameters; including, in a bitstream that includes an encoded representation of the video data, a coded slice Network Abstraction Layer (NAL) unit for a slice of a picture of a current layer of the video data, the coded slice NAL unit including a syntax element that specifies an identifier of an ALF Adaptation Parameter Set (APS) to which the slice refers, wherein a constraint applied to the syntax element prohibits the syntax element from ever specifying a layer identifier of any ALF APS NAL unit that is unequal to a layer identifier of the coded slice NAL unit, wherein the ALF APS includes data representing the ALF parameters; and using the ALF parameters to apply an ALF to a block of the slice.

Example 26

The method of example 25, wherein the constraint applied to the syntax element requires the syntax element to specify a layer identifier of an ALF APS NAL unit that is equal to the layer identifier of the coded slice NAL unit.

Example 27

The method of any of examples 25-26, wherein the slice is an inter slice.

Example 28

The method of any of examples 25-27, wherein the syntax element specifies the identifier of the ALF APS that a chroma component of the slice refers to.

Example 29

A method of encoding video data, the method including: determining Adaptive Loop Filter (ALF) parameters; including, in a bitstream that includes an encoded representation of the video data, a coded slice Network Abstraction Layer (NAL) unit for a slice of a picture of a current layer of the video data, the coded slice NAL unit including a syntax element that specifies an identifier of an ALF Adaptation Parameter Set (APS) to which the slice refers, wherein a constraint applied to the syntax element prohibits the syntax element from ever specifying a layer identifier of any ALF APS NAL unit that is unequal to a layer identifier of the coded slice NAL unit or a layer identifier of a layer used to predict the current layer, wherein the ALF APS includes data representing the ALF parameters; and using the ALF parameters to apply an ALF to a block of the slice.

Example 30

The method of example 29, wherein the constraint applied to the syntax element requires the syntax element to specify a layer identifier of an ALF APS NAL unit that is equal to the layer identifier of the coded slice NAL unit or equal to a layer identifier of a layer used to predict the current layer.

Example 31

The method of any of examples 29-30, wherein the slice is an inter slice.

Example 32

The method of any of examples 29-31, wherein the syntax element specifies the identifier of the ALF APS that a chroma component of the slice refers to.

Example 33

A method of encoding video data, the method including: including, in a bitstream that includes an encoded representation of the video data, an Adaptation Parameter Set (APS) Network Abstraction Layer (NAL) unit; including, in the bitstream, a Video Coding Layer (VCL) NAL unit that follows the APS NAL unit in the bitstream; and wherein the VCL NAL unit belongs to the same access unit as the APS NAL unit.

Example 34

A method of encoding video data, the method including: including, in a bitstream that includes an encoded representation of the video data, a series of Network Abstraction Layer (NAL) units that includes Video Coding Layer (VCL) NAL units with a same Picture Order Count (POC) value interleaved with Adaptive Parameter Set (APS) NAL units within an access unit.

Example 35

A method of encoding video data, the method including including, in a bitstream that includes an encoded representation of the video data, an Adaptation Parameter Set (APS) associated with an access unit, wherein a constraint prohibits the APS associated with the access unit from having an APS identifier equal to any APS identifier used in the access unit; and encoding pictures of a subsequent access unit based on the APS associated with the access unit.

Example 36

A method of encoding video data, the method including including, in a bitstream that includes an encoded representation of the video data, an Adaptation Parameter Set (APS) associated with an access unit, wherein a constraint prohibits the APS associated with the access unit from having an APS identifier equal to any APS identifier used in the access unit unless the APS associated with the access unit has the same content as an existing APS used in the access unit with the same APS identifier; and encoding pictures of a subsequent access unit based on the APS associated with the access unit.

Example 37

A method of encoding video data, the method including generating an Adaptation Parameter Set (APS) that includes a syntax element, wherein the APS is in an access unit of the video data, and the syntax element indicates whether the APS is usable by a current picture in the access unit, wherein when the syntax element indicates that the APS is not usable by the current picture, the APS is usable by a next picture in decoding order; and encoding pictures of a subsequent access unit of the video data based on the APS associated with the access unit.

Example 38

The method of example 37, wherein a bitstream constraint disallows the current picture from using the APS when the syntax element indicates that the APS is not usable by the current picture.

Example 39

The method of example 37, wherein a bitstream constraint requires that if the APS is associated with the current picture and that the APS is present in the same access unit has the current picture, the syntax element shall not indicate that the APS is not usable by the current picture.

Example 40

The method of any of examples 37-39, further including: based on the syntax element indicating that the APS is not usable by the current picture, delaying activation of the APS until a next access unit.

Example 41

The method of any of examples 37-40, wherein generating the APS includes generating the APS in a bitstream that includes an encoded representation of the video data.

Example 42

The method of any of examples 37-41, wherein: generating the APS includes generating the APS as an external system or outside a bitstream that includes an encoded representation of the video data, and based on the APS having been obtained from the external system or from outside the bitstream, a constraint requires the syntax element to specify that the APS is not usable by the current picture.

Example 43

A method of encoding video data, the method including: generating a bitstream that includes an encoded representation of the video data, wherein a constraint specifies that no access unit of the video data can contain more than a threshold number of Adaptation Parameter Set (APS) Network Access Layer (NAL) units.

Example 44

A method of encoding video data, the method including: generating a bitstream that includes an encoded representation of the video data, wherein a constraint specifies that no access unit of the video data can contain more than a threshold number of Adaptation Parameter Set (APS) Network Access Layer (NAL) units of a particular APS identifier.

Example 45

A method of encoding video data, the method including the methods of any of examples 35-44.

Example 46

A method of encoding video data including any combination of one or more of the examples of this disclosure.

Example 47

A device for coding video data, the device including one or more means for performing the method of any of examples 1-46.

Example 48

The device of example 47, wherein the one or more means include one or more processors implemented in circuitry.

Example 49

The device of any of examples 47 and 48, further including a memory to store the video data.

Example 50

The device of any of examples 47-49, further including a display configured to display decoded video data.

Example 51

The device of any of examples 47-50, wherein the device includes one or more of a camera, a computer, a mobile device, a broadcast receiver device, or a set-top box.

Example 52

The device of any of examples 47-51, wherein the device includes a video decoder.

Example 53

The device of any of examples 47-52, wherein the device includes a video encoder.

Example 54

A computer-readable storage medium having stored thereon instructions that, when executed, cause one or more processors to perform the method of any of examples 1-46.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
    obtaining a bitstream that comprises an encoded representation of the video data, wherein the bitstream includes a coded slice Network Abstraction Layer (NAL) unit for a slice of a picture of a current layer of the video data; and
    determining that the bitstream does not satisfy a constraint imposed by a video coding standard based on a determination that (i) a layer identifier of an applicable Luma Mapping and Chroma Scaling (LMCS) Adaptation Parameter Set (APS) NAL unit is not equal to a layer identifier of the coded slice NAL unit and iii) the layer identifier of the applicable LMCS APS NAL unit is not equal to a layer identifier of any layer that is allowed to be used to predict a layer of the coded slice NAL unit,
    wherein the applicable LMCS APS NAL unit has an APS identifier specified by a LMCS APS identifier syntax element for the coded slice NAL unit.

2. The method of claim 1, wherein the bitstream is a first bitstream, the method further comprising decoding a second bitstream based on a determination that the second bitstream satisfies the constraint.

3. The method of claim 1, wherein:
    the constraint is a first constraint, and
    the method further comprises determining that the bitstream does not satisfy a second constraint imposed by the video coding standard based on a temporal identifier of the applicable LMCS APS NAL unit not being less than or equal to a temporal identifier of the coded slice NAL unit.

4. A method of encoding video data, the method comprising:
    obtaining video data from a video source; and
    performing an encoding process that encodes the video data according to a video coding standard, wherein performing the encoding process comprises:
        generating a Luma Mapping and Chroma Scaling (LMCS) Adaptation Parameter Set (APS) identifier syntax element for a coded slice Network Abstraction Layer (NAL) unit, wherein:
            the LMCS APS identifier syntax element specifies a layer identifier of a LMCS APS NAL unit, and
            the video coding standard imposes a constraint on the encoding process that requires the layer identifier of the LMCS APS NAL unit to be equal to a layer identifier of the coded slice NAL unit or (ii) the layer identifier of the LMCS APS NAL unit to be equal to a layer identifier of any layer that is allowed to be used to predict a layer of the coded slice NAL unit.

5. The method of claim 4, wherein the constraint requires the layer identifier of the applicable LMCS APS NAL unit to be equal to the layer identifier of the coded slice NAL unit or equal to the layer identifier of any layer that is used to predict the layer of the coded slice NAL unit.

6. The method of claim 4, wherein:
    the constraint is a first constraint, and
    the video coding standard imposes a second constraint that requires a temporal identifier of the LMCS APS NAL unit to be less than or equal to a temporal identifier of the coded slice NAL unit.

7. A device for processing video data, the device comprising:
    a memory to store the video data; and
    one or more processors implemented in circuitry, the one or more processors configured to:
        obtain a bitstream that comprises an encoded representation of the video data; and
        determine that the bitstream does not satisfy a constraint imposed by a video coding standard based on a determination that (i) a layer identifier of an applicable Luma Mapping and Chroma Scaling (LMCS) Adaptation Parameter Set (APS) Network Abstraction Layer (NAL) unit is not equal to a layer identifier of the coded slice NAL unit and (ii) the layer identifier of the applicable LMCS APS NAL unit is not equal to a layer identifier of any layer that is allowed to be used to predict a layer of the coded slice NAL unit,
        wherein the applicable LMCS APS NAL unit has an APS identifier specified by a LMCS APS identifier syntax element for the coded slice NAL unit.

8. The device of claim 7, wherein the one or more processors are further configured to decode the bitstream based on a determination that the bitstream satisfies the constraint.

9. The device of claim 7, further comprising a display configured to display decoded video data.

10. The device of claim 7, wherein:
the constraint is a first constraint, and
the one or more processors are further configured to determine that the bitstream does not satisfy a second constraint imposed by the video coding standard based on a temporal identifier of the applicable LMCS APS NAL unit not being less than or equal to a temporal identifier of the coded slice NAL unit.

11. The device of claim 7, wherein the device comprises one or more of a camera, a computer, a mobile device, a broadcast receiver device, or a set-top box.

12. A device for encoding video data, the device comprising:
a memory to store the video data; and
one or more processors implemented in circuitry, the one or more processors configured to:
obtain video data from a video source; and
perform an encoding process that encodes the video data according to a video coding standard, wherein the one or more processors are configured such that, as part of performing the encoding process, the one or more processors:
generate a Luma Mapping and Chroma Scaling (LMCS) Adaptation Parameter Set (APS) identifier syntax element for a coded slice Network Abstraction Layer (NAL) unit, wherein:
the LMCS APS identifier syntax element specifies a layer identifier of a LMCS APS NAL unit, and
the video coding standard imposes a constraint on the encoding process that requires (i) the layer identifier of the LMCS APS NAL unit to be equal to a layer identifier of the coded slice NAL unit or (ii) the layer identifier of the LMCS APS NAL unit to be equal to a layer identifier of any layer that is allowed to be used to predict a layer of the coded slice NAL unit.

13. The device of claim 12, wherein the constraint requires the layer identifier of the applicable LMCS APS NAL unit to be equal to the layer identifier of the coded slice NAL unit or equal to the layer identifier of any layer that is used to predict the layer of the coded slice NAL unit.

14. The device of claim 12, wherein:
the constraint is a first constraint, and
the video coding standard imposes a second constraint that requires a temporal identifier of the LMCS APS NAL unit to be less than or equal to a temporal identifier of the coded slice NAL unit.

15. The device of claim 12, wherein the device comprises one or more of a camera, a computer, a mobile device, a broadcast receiver device, or a set-top box.

16. A device for processing video data, the device comprising:
means for obtaining a bitstream that comprises an encoded representation of the video data; and
means for determining that the bitstream does not satisfy a constraint imposed by a video coding standard based on a determination that (i) a layer identifier of an applicable Luma Mapping and Chroma Scaling (LMCS) Adaptation Parameter Set (APS) Network Abstraction Layer (NAL) unit is not equal to a layer identifier of the coded slice NAL unit and (ii) the layer identifier of the applicable LMCS APS NAL unit is not equal to a layer identifier of any layer that is allowed to be used to predict a layer of the coded slice NAL unit,
wherein the applicable LMCS APS NAL unit has an APS identifier specified by a LMCS APS identifier syntax element for the coded slice NAL unit.

17. The device of claim 16, further comprising means for decoding the bitstream based on a determination that the bitstream satisfies the constraint.

18. The device of claim 16, wherein:
the constraint is a first constraint, and
the device further comprises means for determining that the bitstream does not satisfy a second constraint imposed by the video coding standard based on a temporal identifier of the applicable LMCS APS NAL unit not being less than or equal to a temporal identifier of the coded slice NAL unit.

19. A device for encoding video data, the device comprising:
means for obtaining video data from a video source; and
means for performing an encoding process that encodes the video data according to a video coding standard, wherein the means for performing the encoding process comprises:
generating a Luma Mapping and Chroma Scaling (LMCS) Adaptation Parameter Set (APS) identifier syntax element for a coded slice Network Abstraction Layer (NAL) unit, wherein:
the LMCS APS identifier syntax element specifies a layer identifier of a LMCS APS NAL unit, and
the video coding standard imposes a constraint on the encoding process that requires (i) the layer identifier of the LMCS APS NAL unit to be equal to a layer identifier of the coded slice NAL unit or (ii) the layer identifier of the LMCS APS NAL unit to be equal to a layer identifier of any layer that is allowed to be used to predict a layer of the coded slice NAL unit.

20. The device of claim 19, wherein the constraint requires the layer identifier of the applicable LMCS APS NAL unit to be equal to the layer identifier of the coded slice NAL unit or equal to the layer identifier of any layer that is used to predict the layer of the coded slice NAL unit.

21. The device of claim 19, wherein:
the constraint is a first constraint, and
the video coding standard imposes a second constraint that requires a temporal identifier of the LMCS APS NAL unit to be less than or equal to a temporal identifier of the coded slice NAL unit.

22. A non-transitory computer-readable data storage medium having stored thereon instructions that, when executed, cause one or more processors to:
obtain a bitstream that comprises an encoded representation of the video data; and
determine that the bitstream does not satisfy a constraint imposed by a video coding standard based on a determination that (i) a layer identifier of an applicable Luma Mapping and Chroma Scaling (LMCS) Adaptation Parameter Set (APS) Network Abstraction Layer (NAL) unit is not equal to a layer identifier of the coded slice NAL unit and iii) the layer identifier of the applicable LMCS APS NAL unit is not equal to a layer identifier of any layer that is allowed to be used to predict a layer of the coded slice NAL unit,
wherein the applicable LMCS APS NAL unit has an APS identifier specified by a LMCS APS identifier syntax element for the coded slice NAL unit.

23. A non-transitory computer-readable data storage medium having stored thereon instructions that, when executed, cause one or more processors to:
  obtain video data from a video source; and
  perform an encoding process that encodes the video data according to a video coding standard, wherein the instructions that cause the one or more processors to perform the encoding process comprise instructions that, when executed, cause the one or more processors to:
    generate a Luma Mapping and Chroma Scaling (LMCS) Adaptation Parameter Set (APS) identifier syntax element for a coded slice Network Abstraction Layer (NAL) unit, wherein:
      the LMCS APS identifier syntax element specifies a layer identifier of a LMCS APS NAL unit, and
      the video coding standard imposes a constraint on the encoding process that requires (i) the layer identifier of the LMCS APS NAL unit to be equal to a layer identifier of the coded slice NAL unit or (ii) the layer identifier of the LMCS APS NAL unit to be equal to a layer identifier of any layer that is allowed to be used to predict a layer of the coded slice NAL unit.

* * * * *